United States Patent
Anderson et al.

(10) Patent No.: US 10,261,875 B2
(45) Date of Patent: Apr. 16, 2019

(54) RUNTIME OPTIMIZATION OF MULTI-CORE SYSTEM DESIGNS FOR INCREASED OPERATING LIFE AND MAXIMIZED PERFORMANCE

(71) Applicant: QUALCOMM Incorporated, San Diego, CA (US)

(72) Inventors: Jon James Anderson, Boulder, CO (US); Richard Alan Stewart, San Diego, CA (US); Ali Akbar Merrikh, Austin, TX (US); Christopher Platt, Erie, CO (US); Hans Lee Yeager, Chapel Hill, NC (US); Ryan Donovan Wells, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/486,820

(22) Filed: Apr. 13, 2017

(65) Prior Publication Data
US 2017/0220384 A1    Aug. 3, 2017

Related U.S. Application Data

(63) Continuation-in-part of application No. 14/563,333, filed on Dec. 8, 2014, now abandoned, which is a
(Continued)

(51) Int. Cl.
*G06F 9/44* (2018.01)
*G06F 11/20* (2006.01)
(Continued)

(52) U.S. Cl.
CPC ......... *G06F 11/203* (2013.01); *G06F 9/4893* (2013.01); *G06F 9/5083* (2013.01);
(Continued)

(58) Field of Classification Search
CPC ...................................................... G06F 11/203
(Continued)

(56) References Cited

U.S. PATENT DOCUMENTS

| | | | |
|---|---|---|---|
| 5,557,777 A | | 9/1996 | Culbert |
| 6,073,251 A | * | 6/2000 | Jewett ................. G06F 1/12 714/6.32 |

(Continued)

FOREIGN PATENT DOCUMENTS

| | | |
|---|---|---|
| JP | 2000235505 A | 8/2000 |
| JP | 2012216232 A | 11/2012 |

(Continued)

OTHER PUBLICATIONS

Asberg M., et al., "Fast Linux Bootup using Non-Intrusive Methods for Predictable Industrial Embedded Systems," 18th Conference on Emerging Technologies & Factory Automation, IEEE, 2013, 8 pages.

(Continued)

*Primary Examiner* — Wei Y Zhen
*Assistant Examiner* — Lanny N Ung
(74) *Attorney, Agent, or Firm* — The Marbury Law Group, PLLC

(57) ABSTRACT

Aspects include computing devices, systems, and methods for managing a first computing device component of a computing device in order to extend an operating life of the computing device component. In an aspect, a processing device may determine a condition estimator of the first computing device component, determine whether the condition estimator of the first computing device component indicates that a condition of the first computing device component is worse than the condition of a second computing device component, and assign workloads to the first and second computing device components to balance deteriora-
(Continued)

tion of the condition of the first and second computing device components in response to determining that the condition estimator of the first computing device component indicates that the condition of the first computing device component is worse than the condition of the second computing device component.

26 Claims, 19 Drawing Sheets

Related U.S. Application Data continuation-in-part of application No. 14/166,984, filed on Jan. 29, 2014, now Pat. No. 9,606,843.

(60) Provisional application No. 61/917,487, filed on Dec. 18, 2013.

(51) Int. Cl.
  G06F 9/48 (2006.01)
  G06F 9/50 (2006.01)

(52) U.S. Cl.
  CPC .... G06F 11/2028 (2013.01); *G06F 2201/805* (2013.01); *G06F 2201/81* (2013.01); *G06F 2201/82* (2013.01); *Y02D 10/24* (2018.01)

(58) Field of Classification Search
  USPC .......................................................... 718/104
  See application file for complete search history.

(56) References Cited

U.S. PATENT DOCUMENTS

| | | | |
|---|---|---|---|
| 6,434,696 | B1 | 8/2002 | Kang |
| 6,993,767 | B2 | 1/2006 | Brenner et al. |
| 7,802,073 | B1 | 9/2010 | Cheng et al. |
| 9,298,504 | B1 | 3/2016 | Vincent |
| 2004/0221193 | A1* | 11/2004 | Armstrong .......... G06F 11/2028 714/10 |
| 2006/0095913 | A1 | 5/2006 | Bodas et al. |
| 2006/0230308 | A1 | 10/2006 | Barlow et al. |
| 2007/0006021 | A1 | 1/2007 | Nicholson et al. |
| 2008/0077784 | A1 | 3/2008 | Robinson et al. |
| 2009/0037911 | A1 | 2/2009 | Ahuja et al. |
| 2009/0055826 | A1 | 2/2009 | Bernstein et al. |
| 2009/0240979 | A1 | 9/2009 | Campini et al. |
| 2009/0327680 | A1 | 12/2009 | Dale et al. |
| 2010/0037038 | A1 | 2/2010 | Bieswanger et al. |
| 2010/0107166 | A1 | 4/2010 | Topaloglu |
| 2011/0161646 | A1 | 6/2011 | Yu et al. |
| 2011/0173432 | A1* | 7/2011 | Cher ................. G01R 31/31725 713/100 |
| 2011/0239016 | A1 | 9/2011 | Boyd et al. |
| 2012/0041707 | A1 | 2/2012 | Hsu |
| 2012/0109339 | A1 | 5/2012 | Chang |
| 2012/0117364 | A1 | 5/2012 | Rosenquist et al. |
| 2012/0317568 | A1 | 12/2012 | Aasheim |
| 2013/0047166 | A1* | 2/2013 | Penzes ................. H03K 3/0315 718/105 |
| 2013/0067132 | A1 | 3/2013 | Guddeti et al. |
| 2013/0086395 | A1 | 4/2013 | Liu |
| 2013/0132535 | A1 | 5/2013 | Basso et al. |
| 2013/0155073 | A1 | 6/2013 | Khodorkovsky et al. |
| 2013/0238887 | A1 | 9/2013 | Xu et al. |
| 2014/0115588 | A1 | 4/2014 | Traut et al. |
| 2014/0173595 | A1 | 6/2014 | Anand et al. |
| 2014/0181596 | A1 | 6/2014 | Rusu et al. |
| 2014/0181829 | A1 | 6/2014 | Hathaway et al. |
| 2014/0189704 | A1 | 7/2014 | Narvaez et al. |
| 2014/0244212 | A1* | 8/2014 | Allen-Ware ........ G01R 31/2851 702/182 |
| 2015/0039877 | A1 | 2/2015 | Hall et al. |
| 2015/0169363 | A1 | 6/2015 | Anderson |
| 2015/0169382 | A1 | 6/2015 | Anderson et al. |

FOREIGN PATENT DOCUMENTS

| | | |
|---|---|---|
| JP | 2014514660 A | 6/2014 |
| WO | 2007038530 A2 | 4/2007 |
| WO | 2012142512 A1 | 10/2012 |
| WO | 2013126066 A1 | 8/2013 |

OTHER PUBLICATIONS

International Search Report and Written Opinion—PCT/US2014/069380—ISA/EPO—dated Aug. 12, 2015.
Partial International Search Report—PCT/US2014/069380—ISA/EPO—dated Mar. 12, 2015.
Basoglu M., et al., "NBTI-aware DVFS: A New Approach to Saving Energy and Increasing Processor Lifetime", Low-Power Electronics and Design (ISLPED), 2010 ACM/IEEE International Symposium on, IEEE, Piscataway, NJ, USA, Aug. 18, 2010 (Aug. 18, 2010), XP031773626, pp. 253-258.
Chantem T., et al., "Enhancing Multicore Reliability Through Wear Compensation in Online Assignment and scheduling", Design, Automation and Test in Europe, EDA Consortium, 111 West Saint John Street, Suite 220 San Jose CA 95113 USA, Mar. 18, 2013 (Mar. 18, 2013), XP058019064, pp. 1373-1378.
International Search Report and Written Opinion—PCT/US2018/023254—ISA/EPO—dated Jun. 15, 2018. 14 pages.

* cited by examiner

400

| High Level Operating System Processor Core Identification (Virtual) | Hardware Processor Core Identification/Priority (Physical) |
|---|---|
| Processor Core 0 | Processor Core 2 |
| Processor Core 1 | Processor Core 0 |
| Processor Core 2 | Processor Core 3 |
| Processor Core 3 | Processor Core 1 |

FIG. 4

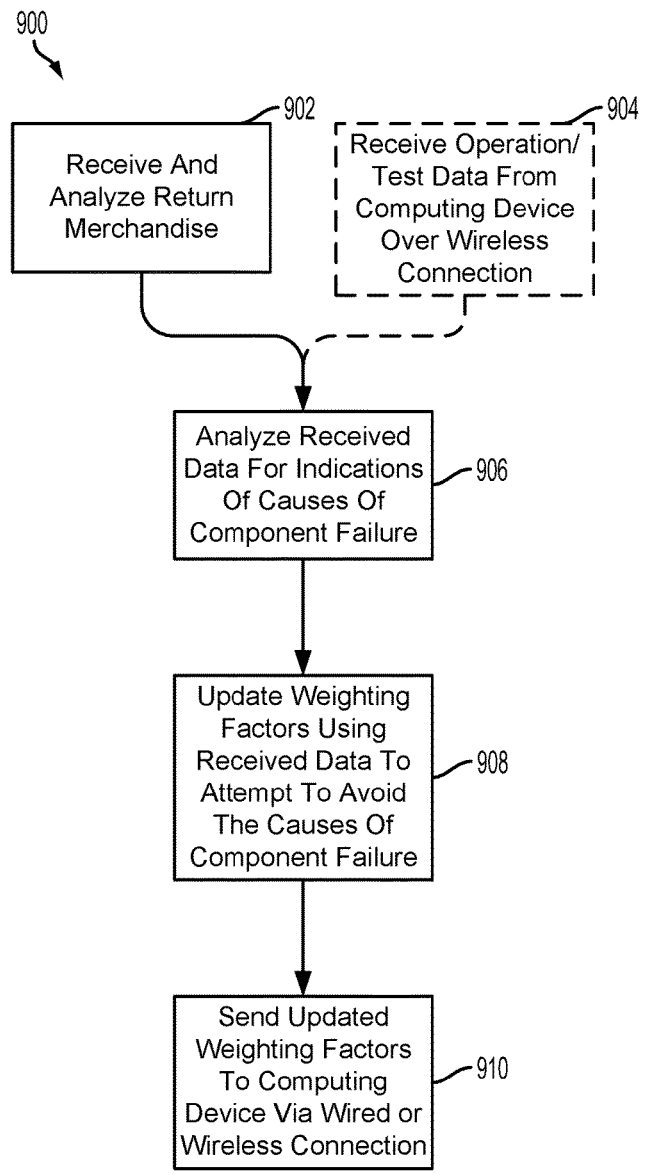
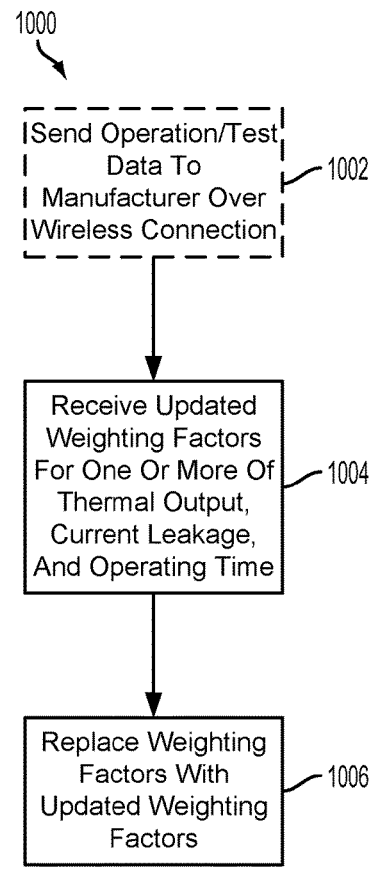
FIG. 10
FIG. 9

RUNTIME OPTIMIZATION OF MULTI-CORE SYSTEM DESIGNS FOR INCREASED OPERATING LIFE AND MAXIMIZED PERFORMANCE

RELATED APPLICATIONS

This application is a continuation-in-part of U.S. patent application Ser. No. 14/563,333 entitled "Runtime Optimization of Multi-core System Designs for Increased Operating Life and Maximized Performance" filed Dec. 8, 2014, which is a continuation-in-part of U.S. patent application Ser. No. 14/166,984 entitled "Runtime Optimization of Multi-core System Designs for Increased Operating Life and Maximized Performance" filed Jan. 29, 2014, which claims the benefit of priority to U.S. Provisional Application No. 61/917,487 entitled "Runtime Optimization of Multi-core System Designs for Increased Operating Life and Maximized Performance" filed Dec. 18, 2013, the entire contents of all of which are hereby incorporated by reference for all purposes.

BACKGROUND

The operating life of a high performance digital system is, in part, a function of heating and cooling cycles of the system's components. Failure of a system's components can cripple or render the system inoperable. One such component is the system's processor, including individual processor cores of a multi-core processor. When constant and extreme thermal cycling occurs, the operating life of the system's components can be reduced as a result of physical damage to the die, packaging, or bonds of the component.

Electronic components, such as processors, that are produced in large manufacturing lots tend to exhibit differences in their internal resistance which leads to differences in the amount of current that is used per unit time for a given operating state. Due to such manufacturing variability, if there is more than one of such component in a computing device, one or a few of them are likely to have greater current usage than the others, and so are referred to herein as "higher leakage components." Higher leakage components tend to exhibit lower performance levels compared to their lower leakage counterparts, but can achieve higher frequency/performance levels with less power or when thermally constrained. Higher leakage components also tend to run at higher temperatures than the lower leakage components due to higher internal resistance. The higher temperatures of higher leakage components may lead to reduced operating life compared to lower leakage components. Thermal cycling may change the leakage characteristics of the components overtime, and thus the differences in operating temperature and operating life may increase as the computing device ages, wears, or deteriorates. In other words, the computing device age increases with additional thermal stress beyond reliability limits.

SUMMARY

The methods and apparatuses of various aspects provide circuits and methods for assigning processing tasks to processor cores within a multi-core processor in order to extend an operating life of the multi-core processor. Various aspects may include determining a priority for each of a plurality of processor cores of a computing device, and assigning processor requests to specific processor cores of the plurality of processor cores based on the determined priority for each of the plurality of processor cores.

The methods and apparatuses of various aspects provide circuits and methods for managing a first computing device component of a computing device in order to extend an operating life of the first computing device component. Various aspects may include determining a condition estimator of the first computing device component, determining whether the condition estimator of the first computing device component indicates that a condition of the first computing device component is worse than a condition of a second computing device component, and assigning workloads to the first computing device component and the second computing device component to balance deterioration of the condition of the first computing device component with the deterioration of the condition of the second computing device component in response to determining that the condition estimator of the first computing device component indicates that the condition of the first computing device component is worse than the condition of the second computing device component.

Some aspects may further include determining whether the condition estimator of the first computing device component indicates that a rate of deterioration of the condition of the first computing device component exceeds a rate of deterioration of the condition of the second computing device component, and configuring an operating parameter of the first computing device component to slow the rate of deterioration of the condition of the first computing device component in response to determining that the rate of deterioration of the condition of the first computing device component exceeds the rate of deterioration of the condition of the second computing device component.

Some aspects may further include detecting a fault by the first computing device component using the condition estimator of the first computing device component, determining whether the condition estimator of the first computing device component indicates that the first computing device component has failed, and taking the first computing device component offline in response to determining that the condition estimator of the first computing device component indicates that the first computing device component has failed.

Some aspects may further include determining a fault rate of the first computing device component using the condition estimator of the first computing device component, determining whether the fault rate of the first computing device component equals or exceeds a fault threshold in response to determining that the condition estimator of the first computing device component indicates that the first computing device component has not failed, and configuring an operating parameter of the first computing device component to reduce the fault rate of the first computing device component in response to determining that the fault rate of the first computing device component equals or exceeds the fault threshold.

Some aspects may further include rebooting the first computing device component in response to detecting the fault by the first computing device component, in which determining whether the condition estimator of the first computing device component indicates that the first computing device component has failed may include running a self test for the first computing device component after rebooting the first computing device component, and determining the condition estimator of the first computing device component.

In some aspects, determining whether the condition estimator of the first computing device component indicates that the first computing device component has failed may include determining a fault rate of the first computing device component using the condition estimator of the first computing device component, and determining whether the fault rate of the first computing device component equals or exceeds a failure threshold. Some aspects may further include determining whether the condition estimator of the offline first computing device component indicates that the first computing device component is still failed, and bringing the first computing device component back online in response to determining that the condition estimator of the offline first computing device component indicates that the first computing device component is not still failed.

Some aspects may further include measuring a component condition parameter of a first type of the first computing device component, storing the component condition parameter of the first computing device component in correlation with a component condition parameter of a second type of the first computing device component, and calculating the condition estimator using the component condition parameter of the first computing device component and the component condition parameter of the second type of the first computing device component.

Some aspects may further include updating the component condition parameter of the first type of the first computing device component with a later measurement of the component condition parameter of the first type of the first computing device component.

Further aspects include a computing device having a first computing device component, a second computing device component, and a processor configured to perform operations of the methods summarized above. Further aspects include a computing device having means for performing functions of the methods summarized above. Further aspects include a non-transitory processor-readable storage medium having stored thereon processor-executable instructions configure to cause a processing device of a computing device to perform operations of the methods summarized above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 4 is an example table relating a high level operating system processor core identification to a hardware processor core priority, for runtime optimization of multi-core system designs for increased operating life and maximized performance, in accordance with an aspect.

FIG. 9 is a process flow diagram illustrating an aspect method for updating weighting values for use in determining core priorities based on operational experience.

FIG. 10 is a process flow diagram illustrating an aspect method for updating weighting values for use in determining core priorities based on operational experience.

DETAILED DESCRIPTION

Figure 1:
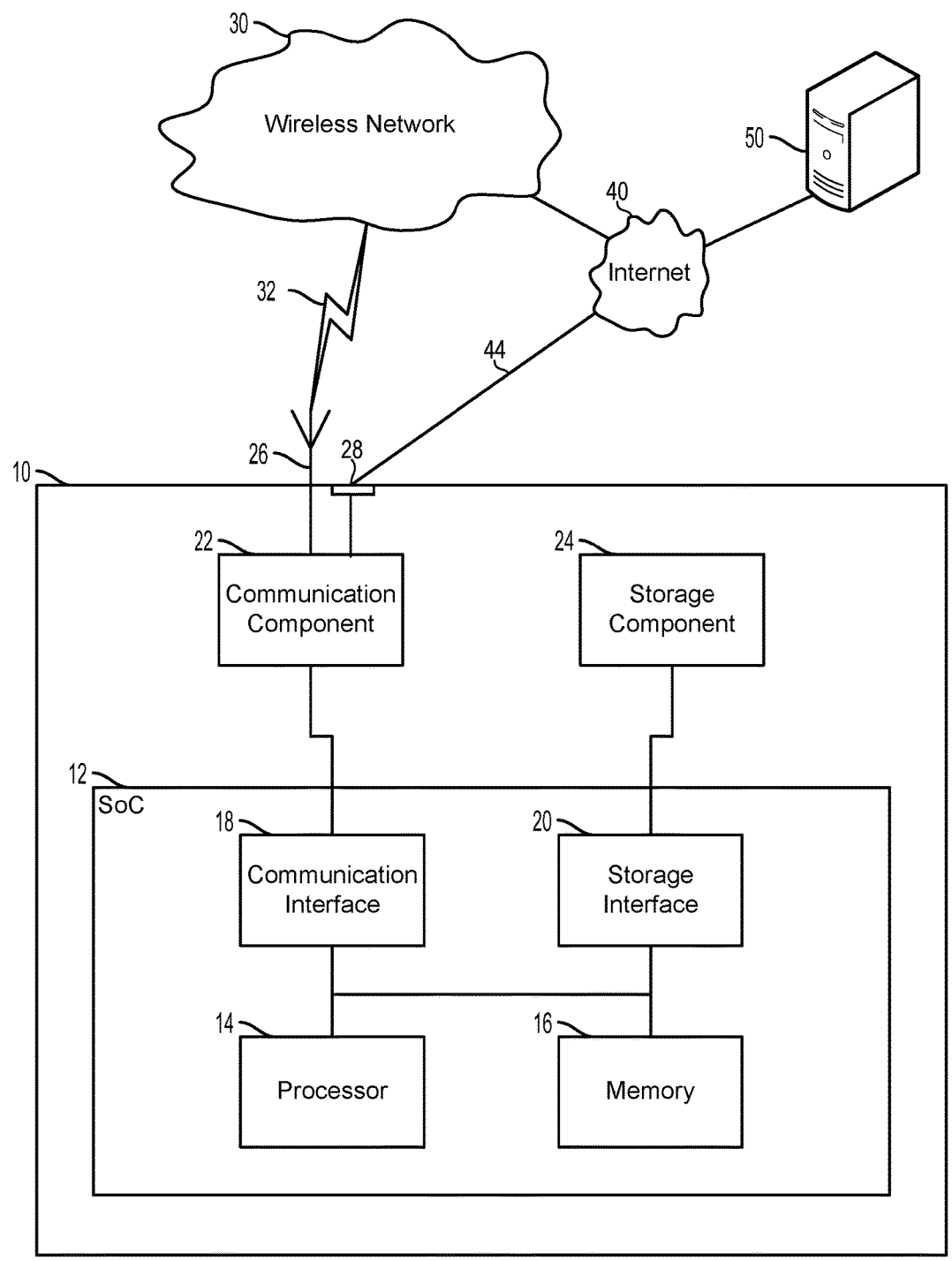
FIG. 1 is a component block diagram of an example computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" is used herein to refer to any one or all of cellular telephones, smartphones, personal or mobile multi-media players, personal data assistants (PDA's), personal computers, laptop computers, tablet computers, smartbooks, ultrabooks, palm-top computers, wireless electronic mail receivers, multimedia Internet enabled cellular telephones, wireless gaming controllers, desktop computers, compute servers, data servers, telecommunication infrastructure rack servers, video distribution servers, application specific servers, and similar personal or commercial electronic devices which include a memory, and one or more programmable multi-core processors.

The terms "system-on-chip" (SoC) and "integrated circuit" are used interchangeably herein to refer to a set of interconnected electronic circuits typically, but not exclusively, including multiple hardware cores, a memory, and a communication interface. The hardware cores may include a variety of different types of processors, such as a general purpose multi-core processor, a multi-core central processing unit (CPU), a multi-core digital signal processor (DSP), a multi-core graphics processing unit (GPU), a multi-core accelerated processing unit (APU), a neural processing unit (NPU), a math coprocessor, a multi-core auxiliary processor, and the like including other known and future processors. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits (IC) may be configured such that the components of the integrated circuit reside on a single piece of semiconductor material, such as silicon. Such a configuration may also be referred to as the IC components being on a single chip.

A computing device may include multiple equivalent processor cores, such that each core is constructed for the same purposes and/or to have the same capabilities. Even within a single multi-core processor chip, equivalent processor cores may have slightly different physical and performance characteristics due to intrinsic, natural variations in the equivalent processor cores' component materials. These differences may introduce variability in the processing speed, power consumption, and thermal performance of each processor core in a computing device. Processor cores may wear, age, and/or deteriorate differently over time due to variable usage, heat cycling, and operating temperature due to their characteristic current leakage. The terms "age," "aging," "aged," "wear," "wearing," "worn," "deteriorate," "deteriorating," "deteriorated," and "deterioration," are used interchangeably herein to illustrate the changing conditions of computing device components. Excessive wear on one or more processor cores may cause the computing device to exhibit declining performance or fail even though not all processor cores have worn excessively or failed, as described further herein. For example, declining performance may be exhibited as a decrease in frequency at a voltage and a temperature. Failure may include a timing related failure caused by timing tables having voltage and frequency relationships that are not updated as the various processor cores age, resulting in silent data corruption, computing a wrong value, or a system failure due to wrongly issued instructions. Failure may include electro migration creating a wire open or short condition for a computing device component preventing the computing device component from functioning at any voltage or frequency.

In a computing device in which all equivalent processor cores may not always run concurrently, the aspects enable increasing the operating life of the equivalent processor cores, and thereby the computing device, by directing tasks to the cores in a priority order determined by their usage history as well as current performance characteristics. An aspect may also improve the performance of the system by directing tasks to the cores such a manner. The characteristics of the processor cores may vary as they wear over time, so manufacturer data may not be reliable. The current characteristics of the processor cores may be determined by measuring thermal output (indicative of thermal behavior, including thermal resistance, thermal capacitance, temperature sensor measurement, thermal cycling, etc.) and/or current leakage for normally operating processor cores, or for processor cores under a built in self test designated for producing the results necessary to determine the current characteristics. Current characteristics of the processor cores may also be determined based upon measurable characteristics, such as by an aging detector. Historical operational time for the processor cores may also be retrieved. The current characteristic data may be applied to a weighted function to produce priorities for the processor cores. The priorities may be used to assign processes and processing tasks to the processor cores based on their level of wear to enable components within a system-on-chip to age or wear out at about the same time. For example, the processor cores with the least wear may be prioritized to run more processes as they are less likely to fail and to cause multiple processor cores reach their respective end of life at about the same time, thereby reduce the chances for premature failure.

In an aspect, the weighted factors used in the function for determining the priorities of the processor cores may be updated over the air so that original equipment manufacturers (OEMs), wireless service providers, or chipset suppliers can revise these weighted factors and improve system reliability and performance in fielded units. The updating the weighted factors may be based on information obtained from examining returned merchandise (e.g., devices failing within the warranty period), as well as operational and test data from fielded units.

FIG. 1 illustrates a system having a computing device 10 in communication with a processor manufacturer server 50. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 or connecting to a wired connection 44 to the Internet 40. The processor 14 may include any of a variety of hardware cores as described above. The processor 14 may further include a number of processor cores. The SoC 12 may include one or more processors 14. The computing device 10 may include one or more SoCs 12, thereby increasing the number of processors 14 and processor cores. The computing device 10 may also include processor cores 14 that are not associated with an SoC 12. The processors 14 may each be configured for specific purposes that may be the same or different from other processors 14 of the computing device 10. Processors 14 configured for the same purpose may be considered equivalent processors. Further, equivalent processors 14 may be configured to have similar performance characteristics. Further, individual processors 14 may be multi-core processors as described below with reference to FIG. 2.

The memory 16 of the SoC 12 may be a volatile or non-volatile memory configured for storing data and processor-executable code for access by the processor 14. In an aspect, the memory 16 may be configured to, at least temporarily, store a data structure, such as a table as described below with reference to FIG. 4, for relating and translating between a high level operating system processor core identification to a hardware processor core priority. As discussed in further detail below, each of the processor cores of the processor 14 may be prioritized or given and identification value that is shared with a high level operating system running on the computing device 10.

The computing device 10 and/or SoC 12 may include one or more memories 16 configured for various purposes. In an aspect, one or more memories 16 or a portion of a memory 16 may be configured to be dedicated to storing the data structure for storing core priority information, such that the information of the data structure may be accessed by one or more processors 14. When the memory 16 storing the data structure is non-volatile, the memory 16 may retain the information of the data structure even after the power of the computing device 10 has been shut off. When the power is turned back on and the computing device 10 reboots, the memory 16 may be available to the computing device 10 to provide the information of the data structure. In another aspect, the memory 16 may also store and maintain weighting values, and historical processor core operation and/or test data, which may be used to assign the hardware processor core priorities or to send to the processor core manufacturer 28 for use in updating the weighting values.

The communication interface 18, communication component 22, antenna 26 and/or network interface 28, may work in unison to enable the computing device 10 to communicate over a wireless network 30 via a wireless connection 32, and/or a wired network 44 with the processor core manufacturer server 50. The wireless network 30 may be implemented using a variety of wireless communication technologies, including, for example, radio frequency spectrum used for wireless communications, to provide the computing device 10 with a connection to the Internet 40 by which it may exchange data with the processor core manufacturer server 50. In an aspect, a wireless network 30 and/or a wired connection 44 to the Internet 40 may be used to communicate operational data and/or test data of the computing device 10 to the processor core manufacturer server 50. In another aspect, the wireless network 30 and/or wired connection 44 to the Internet 40 may be used to communicate updated weighting values, for use in assigning the hardware processor core priorities, from the processor core manufacturer server 50 to the computing device 10.

The storage interface 20 and the storage component 24 may work in unison to allow the computing device 10 to store data on a non-volatile storage medium. The storage component 24 may be configured much like an aspect of the memory 16 in which the storage component 24 may store the data structure, such that the information of the data structure may be accessed by one or more processors 14. The storage component 24, being non-volatile, may retain the information of the data structure even after the power of the computing device 10 has been shut off. When the power is turned back on and the computing device 10 reboots, the storage component 24 may be available to the computing device 10 to provide the information of the data structure. In another aspect, the storage component 24 may also store and maintain weighting values, and historical processor core operation and/or test data, which may be used to assign the hardware processor core priorities or to send to the processor core manufacturer 28 for use in updating the weighting values. The storage interface 20 may control access the storage device 24 and allow the processor 14 to read data from and write data to the storage device 24.

It should be noted that some or all of the components of the computing device 10 may be differently arranged and/or combined while still serving the necessary functions. Moreover, the computing device 10 may not be limited to one of each of the components, and multiple instances of each component, in various configurations, may be included in the computing device 10

Figure 2:
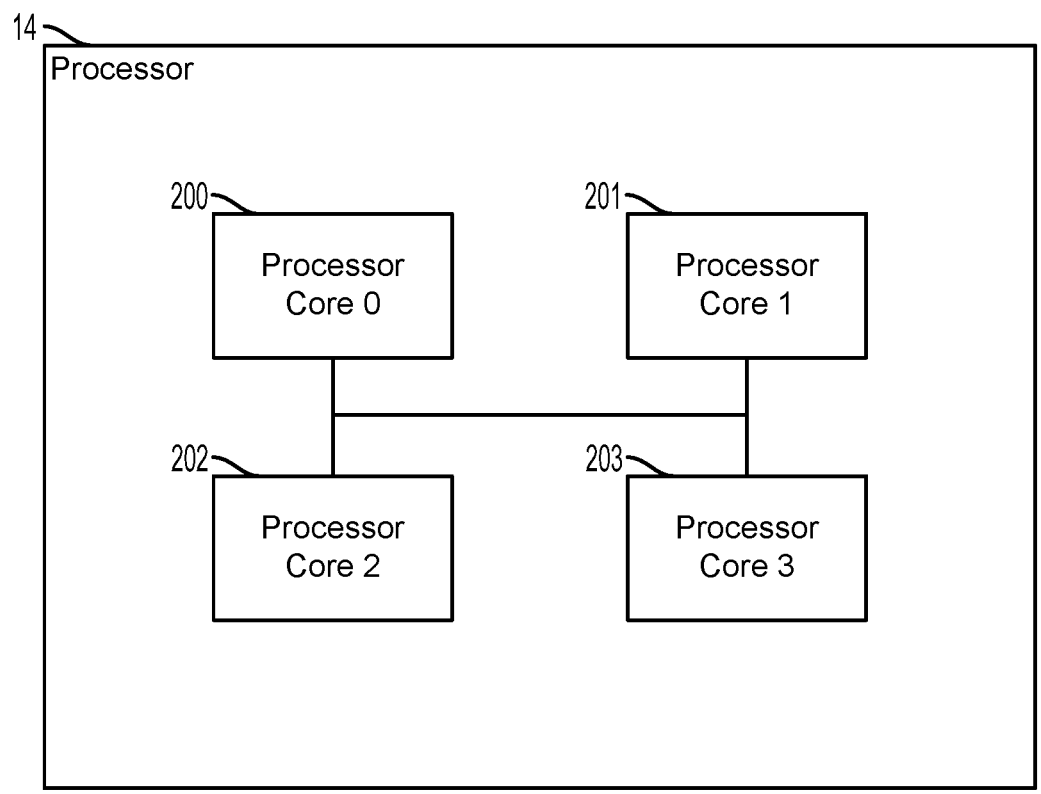
FIG. 2 is a component block diagram of an example multi-core processor suitable for implementing an aspect.

FIG. 2 illustrates a multi-core processor 14 suitable for implementing an aspect. The multi-core processor 14 may have a plurality of equivalent processor cores 200, 201, 202, 203. As described further herein, the processor cores 200, 201, 202, 203 are equivalent in that, processor cores 200, 201, 202, 203 of a single processor 14 may be configured for the same purpose and to have the same performance characteristics. For example, the processor 14 may be a general purpose processor, and the processor cores 200, 201, 202, 203 may be equivalent general purpose processor cores. Alternatively, the processor 14 may be a graphics processing unit or a digital signal processor, and the processor cores 200, 201, 202, 203 may be equivalent graphics processor cores or digital signal processor cores, respectively. Through variations in the manufacturing process and materials, it may result that the performance characteristics of the processor cores 200, 201, 202, 203 may differ from processor core to processor core, within the same multi-core processor 14 or in another multi-core processor 14 using the same designed processor cores. In the example illustrated in FIG. 2, the multi-core processor 14 includes four processor cores 200, 201, 202, 203, (i.e., processor core 0, processor core 1, processor core 2, and processor core 3). For ease of explanation, the examples herein may refer to the four processor cores 200, 201, 202, 203 illustrated in FIG. 2. However, it should be noted that FIG. 2 and the four processor cores 200, 201, 202, 203 illustrated and described herein are in no way meant to be limiting. The computing device 10, the SoC 12, or the multi-core processor 14 may individually or in combination include fewer or more than the four processor cores 200, 201, 202, 203.

Figure 3:
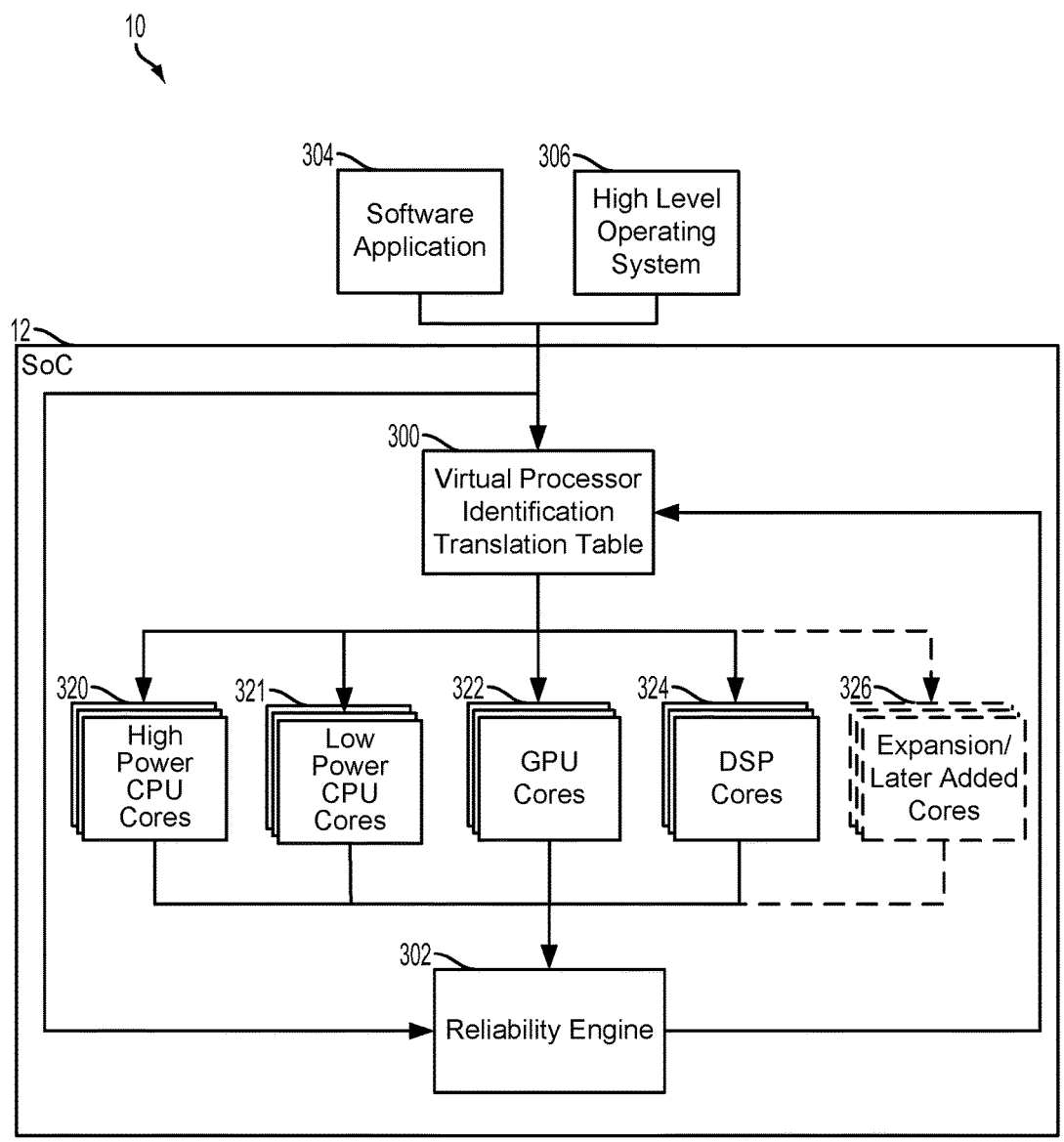
FIG. 3 is a functional and component block diagram of a system-on-chip suitable for implementing an aspect.

FIG. 3 illustrates a computing device 10 having an SoC 12 including multiple processor cores 320, 321, 322, 324, 326, and a reliability engine 302 for runtime optimization of multi-core system designs for increased operating life and maximized performance, in accordance with an aspect. The computing device 10 may include the SoC 12 having the processor cores 320, 321, 322, 324, 326, as well as a virtual processor identification translation table 300 and a reliability engine 302. The computing device 10 may also include software applications 304 and a high level operating system 306 which may be configured to communicate with the components of the SoC 12.

In FIG. 3, different types of multi-core processors are illustrated, including a high performance/high leakage multi-core general purpose/central processing unit (CPU) 320 (referred to as a "high power CPU core" in the figure), low performance/low leakage multi-core general purpose/central processing unit (CPU) 321 (referred to as a "low power CPU core" in the figure), a multi-core graphics processing unit (GPU) 322, a multi-core digital signal processor (DSP) 324, and other multi-core computational units 326. Recent computing device architectures are including a cluster of general purpose CPUs that exhibit high performance but at the cost of high current leakage, and another cluster of CPUs that exhibit lower performance but lower current leakage. The two clusters of CPUs may maintain coherent caches, and therefore both clusters of CPUs may be up and running simultaneously. For purposes of this disclosure each cluster of CPUs may be prioritized independently. Also, for purposes of this disclosure, computational elements with similar characteristics are generally grouped together; however, this is not a requirement. For example, DSP clusters may be distinguished in a similar manner, and thus the aspects include distinguishing computing devices on other axes to distinguish similar processing elements.

FIG. 3 also illustrates that processor cores 326 may be installed in the computing device after it is sold, such as an expansion or enhancement of processing capability or as an update to the computing device. After-market expansions of processing capabilities are not limited to central processor cores, and may be any type of computing module that may be added to or replaced in a computing system, including for example, additional, upgraded or replacement modem processors, additional or replacement graphics processors (GPUs), additional or replacement audio processors, and additional or replacement DSPs, any of which may be installed as single-chip-multi-core modules or clusters of processors (e.g., on an SoC). Also, in servers, such added or replaced processor components may be installed as processing modules (or blades) that plug into a receptacle and wiring harness interface. Implications of adding additional or replacement processor cores to the computing device are discussed below with reference to FIG. 6.

Each of the groups of processor cores illustrated in FIG. 3 may be part of a multi-core processor 14 as described above. Moreover, these five example multi-core processors (or groups of processor cores) are not meant to be limiting, and the computing device 10 or the SoC 12 may individually or in combination include fewer or more than the five multi-core processors 320, 321, 322, 324, 326 (or groups of processor cores), including types not displayed in FIG. 3.

The reliability engine 302 may be implemented in hardware, software, or a combination of hardware and software. The reliability engine 302 may be configured to analyze data relating to the various processor cores 320, 321, 322, 324, 326 and modify the hardware processor core priorities to increase operating life and maximized performance of the various processor cores 320, 321, 322, 324, 326 and thereby the computing device 10. As described above, processor cores in multi-core processors may wear unevenly. Certain processor cores by virtue of processor, SoC, and/or computing device design may be subject to different operation conditions from other operating cores in the same computing device 10. In an aspect, heat cycling of the processor cores may weaken components of the processor cores causing them to fail. Some processor cores may be positioned within a computing device such that they experience a greater rate and/or degree of heat cycling between hotter and colder temperatures. The differences in heat cycling may also result from use when some processor cores are used more than others. This may result from the types of processes run on a computing device 10 and how the software 302 and high level operating system 304 are configured to specify certain processor cores. Also, processor cores with higher current leakage run at higher temperatures, relative to lower current leakage processor cores. Higher current leakage processor cores also run at lower performance levels relative to their lower current leakage counterparts, but can achieve higher frequency/performance levels with less power or when thermally constrained. Thermal cycling changes the current leakage characteristics of the processor cores over time. The ages of processor cores increase with additional thermal stress beyond reliability limits reducing operating lifetime and performance.

To delay the potential damage caused by the thermal cycling, the reliability engine 302 may analyze data relating to each of the processor cores in multi-core processors 320, 321, 322, 324, 326 and modify the hardware processor core priorities, changing the frequency with which certain processor cores are used. The hardware processor core priorities may also act as physical identifiers for the processor cores.

Since the data relating to the processor cores may differ under varying conditions and generally change overtime due to the wear on the processor cores, it may be insufficient to rely on manufacturer data for the processor cores. The reliability engine 302 may use measured data of the various processor cores, including sensor data captured by sensors located at or close to the multi-core processors 320, 321, 322, 324, 326. In an aspect, the measured data may be captured during normal operation of the multi-core processors 320, 321, 322, 324, 326. In another aspect, when processor cores are idle, or in a quiescent state, such as during boot time of the computing device 10, the computing device may run a built in self test for selected processor cores. The built in self test may load a preset routine or workload on the processor core being tested and measure various performance parameters, such as processing time, voltage drop, current draw, temperature rise, etc. In either the normal operation or the built in self test the thermal output and the current leakage of the processor cores may be captured for at least the selected processor cores. Other data related to the processor cores may be retrieved from the memory 16, the storage component 24, or other dedicated components for retaining or determining the operational time of the individual processor cores and the weighting factors.

Using the data related to the processor cores, the reliability engine 302 may calculate new hardware processor core priorities for the selected processor cores. The hardware processor core priority for each processor core may be a function of one or more of the thermal output, current leakage and operational time for the individual processor core, and their respective weighting factors. The types of data to be used in the function or algorithm used to assign priorities to processor cores may include thermal output, current leakage and operational time, using only selected types, or all types may be used and certain types may be rendered irrelevant by using a weighting factor of zero for the undesired type. The function or algorithm for calculating the priorities may be, for example, as summation of one or more of the types of data augmented by first multiplying each type by its respective weighting factor. The units for each type of data may vary, and operational time may be expressed in percentage of time the processor core is operational while the multi-core processor 14 is operational. The results of the function or algorithm for each processor core may be compared and the priorities determined according to the numerical order of the results of the function. For example, the processor core with the lowest valued result may indicate the least amount of wear and may be given the highest priority. The next lowest valued result may indicate the next least amount of wear and the associated processor core may be given the next highest priority, and so on for all of the processor cores for which the function result is calculated. The processor cores may be selected in groups of equivalent processor cores, and the hardware processor core priorities may only apply within the groups.

The virtual processor identification translation table 300 may be implemented in hardware, software, or a combination of hardware and software. The virtual processor identification translation table 300 may be configured to relate the high level operating system processor core identification to the hardware processor core priority. The high level operating system processor core identification (or core ID) is how the software applications 304 and high level operating system 306 identify the processor cores that will handle specific processing requests, threads, or tasks. The high level operating system processor core identification may act as a virtual identifier for the processor cores. In an aspect, the software applications 304 and high level operating system 306 may be programmed to identify certain processor cores by certain high level operating system processor core identifications. In another aspect, upon booting the computing device 10, or starting the software applications 304 or high level operating system 306, the computing device may instruct the software applications 304 and high level operating system 306 as to which processor cores are associated with which high level operating system processor core identifications. These associations may be static and programmed into the firmware, such as the BIOS, of the computing device 10. Thus, when the software applications 304 and high level operating system 306 make a process request to a particular processor core, they may do so by specifying the high level operating system processor core identification for the particular processor core.

However, the computing device 10 may change priorities of the processor cores, as described further below. The computing device 10 may change the priorities to increase operating life and maximize performance of the processor cores. Changing the priorities of the processor cores may result in the high level operating system processor core identification being associated with a processor core that the computing device 10 does not intend to run the requested process. The virtual processor identification translation table 300 may track the changes in the priorities of the processor cores and associate the high level operating system processor core identifications with the appropriately prioritized processor core. To accomplish this, the virtual processor identification translation table 300 may receive the updated hardware processor core priorities calculated by the reliability engine 302. The virtual processor identification translation table 300 may also associate the high level operating system processor core identifications with the corresponding hardware processor core priority, and update the associations as the hardware processor core priorities change. When, a process request is received specifying a particular high level operating system processor core identification, the computing device may use the virtual processor identification translation table 300 to assign the process to the appropriately prioritized processor core. A table is used herein to describe this feature of the computing device 10, but the virtual processor identification translation may be implemented using a variety of different hardware, data structures, and software algorithms that may achieve the same function as described above. In an aspect, one or more virtual processor identification translation tables 300 may be implemented for numerous groups of processor cores. For example, each group of a type of processor cores, such as a multi-core general purpose CPU 320, 321, a multi-core GPU 322, a multi-core DSP 324, and other multi-core computational units 326, may be combined or separated in various configurations into one or more virtual processor identification translation tables 300.

FIG. 4 illustrates an example table 400 relating the high level operating system processor core identification to the hardware processor core priority in accordance with an aspect. The table 400 continues the example of the four processor cores (processor cores 0-3) illustrated in FIG. 2. The left column 402 represents the high level operating system processor core identifications, which may be used as virtual identifiers for each of the processor cores selected to be in the group represented in the table 400 (e.g., processor cores 0-3). The right column 404 represents the processor core identifications/priorities, which may list the priorities assigned to each processor core that may be used to order the processor cores selected to be in the group represented in the table 400 (processor cores 0-3), and as physical identifiers for each of these processor cores.

Each row 406, 408, 410, 412 of the table 400 relates to one of the processor cores. For example, the first row 406 relates to processor core 0 as it is identified by the high level operating system. In this example, however, the priorities of the processor cores have been shuffled based on the data gathering and the calculations made by the reliability engine described above. Thus, this example shows that in the first row 406, the high level operating system processor core identification processor core 0 is associated with the hardware processor core identification processor core 2, because processor core 2 has the highest priority. Similarly, the high level operating system processor core identification processor core 1, in a second row 408, is associated with hardware processor core identification processor core 0, because processor core 0 has the next highest priority. The same applies to high level operating system processor core identifications processor core 2 and processor core 3, and hardware processor core identifications processor core 3 and processor core 1, in a third row 410 and a fourth row 412, respectively.

The example illustrated in FIG. 4 provides the high level operating system processor core identifications in an increasing numerical order and relates the hardware processor core identifications in an order according to increasing priority. However, the high level operating system processor core identifications and the hardware processor core identifications may be related in any order according to an assignment scheme of the high level operating system. The assignment scheme may predictably provide for a likelihood of the high level operating system making an operation request specifying a high level operating system processor core identification. The hardware processor core identifications may be related to the high level operating system processor core identifications based on correlations of the priorities and likelihoods. In other words, the most likely high level operating system processor core identification may be related to the highest priority hardware processor core identification, and the least likely high level operating system processor core identification may be related to the lowest priority hardware processor core identification.

In an aspect, as far as the high level operating system is concerned, when it makes an operation request specifying a high level operating system processor core identification, the high level operating system expects the operation to be executed by the specified processor core. However, the specified processor core may or may not execute the requested process when the priorities of the processor cores have been shuffled according to the gathered data and the calculations made by the reliability engine. The processor core that executes the requested process may be the processor core having the associated hardware processor core identification in table 400. The result of the processing may be the same as if the high level operating system specified processor core executed the request process. The high level operating system may be oblivious to the possibility that a different processor core than the one it specified may have executed the requested process.

The virtual identifiers, physical identifiers, and priorities may be associated with and calculated for groups of processor cores, such that a row of table 400 may represent a group of processor cores, rather than a single processor core.

A result of determining priorities for the processor cores and mapping/reassigning processing tasks according to priority order may be that the processor cores wear more evenly overtime. By reducing the priority of a processor core that demonstrates greater wear by analyzing the collected data related to the processor core, fewer processes and threads will be performed by the processor core. The less work the processor core is tasked to perform, the fewer heat cycles it will experience, reducing the rate at which the core ages. The higher priority processor cores may be assigned more requested processes or threads, and as a result experience more heat cycles, which may cause greater wear on the components of the higher priority processor cores. As the higher priority processor cores exhibit (or calculated to experience) more wear, the priorities assigned to the processor cores by the aspect method will begin to normalize, resulting in a more equal scheduling of requested processes. Spreading requested processes across processor cores in this manner may result in more even wear out of all processor cores, allowing the computing device to function longer at a higher capacity than if one processor core were assigned more task than other cores, or a higher leakage core is tasked the same as other cores, which could lead to one core wearing out and failing before other cores.

Figure 5:
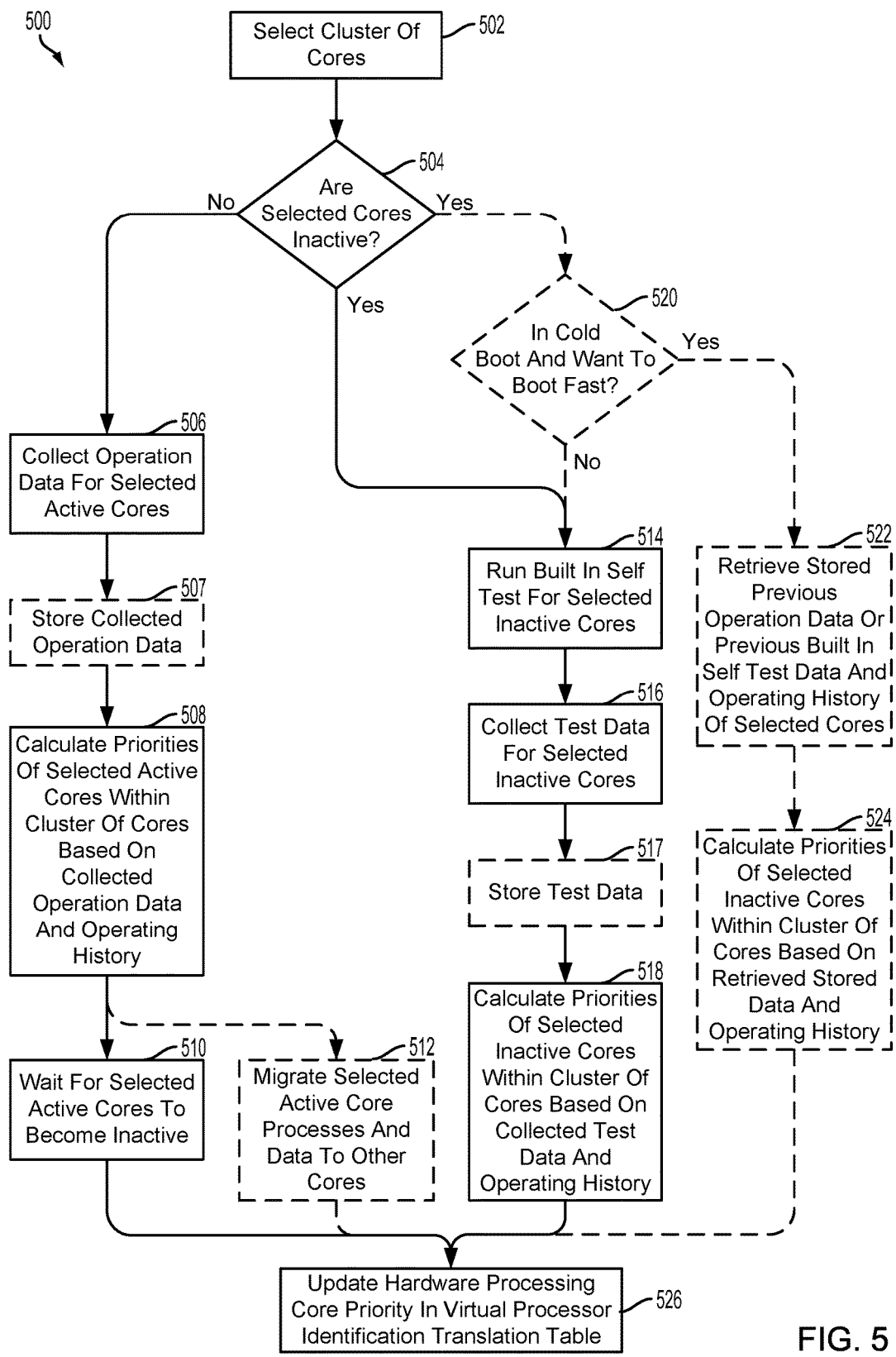
FIG. 5 is a process flow diagram illustrating an aspect method for determining priorities for processor cores.

FIG. 5 illustrates an aspect method 500 for calculating processor core priorities based on information collected from the processor cores. A processor executing the reliability engine may execute the method 500. In block 502 the processor may select a cluster, or group, of equivalent processor cores. As previously described, equivalent processor cores may be configured for the same purpose and to have the same performance characteristics, though the performance characteristics may vary due to manufacturing variability. Thus, the processor may select a group of processor cores configured for the same purpose. For example, the processor may select a group of general purpose processor cores, or groups of graphics or digital signaling processor cores, respectively. When there are multiple equivalent processors, the group of equivalent processor cores may extend across the multiple equivalent processors, or the group may be confined to equivalent processor cores of a single processor.

In determination block 504, the processor may determine whether the selected processor cores are inactive, idle, or in a quiescent state. This determination may affect how the processor implements data gathering and prioritization of the processor cores. When the cores are active, there may not be a need to run a test, because information regarding the processor cores measured from the processor cores' normal activity may be sufficient. Also, prioritizing active processor cores may be a more complex process because active processor cores may be interacting with other components that may expect a particular processor core to be available to execute tasks. When the processor determines that the selected processor cores are active (i.e., determination block 504="No"), the processor may collect operation data for the selected active cores in block 506. In other word, the processor may monitor sensors and collect data from the normal operation of the selected processor cores without running a separate test to obtain readings for the relevant data for the selected processor cores. For example, the processor may monitor the thermal output and the current leakage of the selected processor cores during normal operation.

In optional block 507, this collected operational data and related information may be stored in any nonvolatile memory accessible by the processor, including FLASH memory of the computing device, a storage component configured to store this information, or another component dedicated to tracking and storing data on processor core operational data and cumulative operation time. The operational data stored in non-volatile memory may be used at boot time to set initial processor core priorities and mappings. As part of the data saved in block 507, the operational time or usage of the processor core may be stored in a frequently updated data field. Thus, as part of the operations in block 506, the processor may retrieve from this memory the operational time (i.e., total or relative active time) for the selected processor core. Additional aspects of storing the operational data and related information in block 507 are described herein with reference to block 1904 in FIG. 19.

In block 508 the processor may calculate priorities for each of the selected processor cores based on the collected operation data and operating history. The processor may apply the function or algorithm to the collected data, along with the weighting factors for each of the types of data, for each of the selected processor cores, calculating the new priority values for the selected cores. The function or algorithm used to calculate the priorities may vary. In various aspects, different combinations of one or more of the thermal output, current leakage and operating time, and their weighting factors, may be used to calculate the core priorities. In an aspect, the three types of collected data may be multiplied by their respective weighting factors, and the results summed together to produce a priority value for each processor core. In another aspect, when one of the types of data is to be discounted, the weighting value may be set to zero, or the data of the discounted type may be removed from the function or algorithm.

In block 510 the computing device may wait for the selected processor cores to become inactive. As described above, prioritizing active cores may pose problems when components of the computing device expect particular processor cores to be available to execute certain tasks. However, when an expected processor core is prioritized differently from what is expected, it may leave the components without a processor core to execute the expected task, leading to potential errors in operation of the computing device. Thus, the computing device may wait for the processor cores to become inactive, when there are no scheduled or expected tasks for the processor cores, before changing the processor cores' priority in order to avoid negatively affecting the other components.

In another aspect, in optional block 512 the processor may migrate the selected processor cores' current and expected processes and data to one or more other processor cores. Rather than waiting for the selected processor cores to become inactive, the processor may reassign the current and scheduled processes, and the related data, from the selected processor cores to other processor cores that are available. In this aspect, the components of the computing device may continue to operate as expected with processes and data mapped to different processor cores, in essence, forcing the selected processor cores into a quiescent state when the processing demand on the computing device requires less than all processor cores.

In either aspect, whether waiting for the selected processor cores to become inactive or migrating the processes away from the lower priority processor cores, in block 526 the processor may update the hardware processor core priority in the virtual processor identification translation table. As described above, updating the priorities of the selected processor cores results from ordering or reordering the hardware processor core identifications according to their priority values. The numerical order of the resulting priority values may determine the relative priorities of the selected processor cores. In an aspect, the selected processor core with the first or highest priority value may be moved to the top of the virtual processor identification translation table and associated with the high level operating system processor core identification in the first row. The selected processor core with the second priority value may be moved to the second row of the virtual processor identification translation table and associated with the high level operating system processor core identification in the second row, and so on for all of the selected processor cores.

When the processor determines that the selected processor cores are inactive (i.e., determination block 504="Yes"), the processor may run the built in self test for the selected processor cores in block 514. The built in self test may provide a workload for the selected processor cores to execute so that the processor may collect thermal output and current leakage data from the selected processor cores that are relevant for calculating priorities for the processor cores. The built in self test may be run while the selected processor cores are otherwise inactive, idle, or in a quiescent state. In an aspect, the built in self test may be run for the selected processor cores (which may be preselected as a default group of processor cores) during the boot process of the computing device. In block 516 the processor may collect the relevant data for the selected processor cores obtained during their built in self test. Additional aspects of running the built in self test for the selected processor cores in block 514 are described herein with reference to block 1904 in FIG. 19.

In optional block 517, self test data may be stored in nonvolatile memory accessible by the processor, such as the nonvolatile memory used to store collected operational data in block 507. Storing the self test data in non-volatile memory may enable this information to be used at boot time to set initial processor core priorities and mappings. Additional aspects of storing the self test data in block 517 are described herein with reference to block 1904 in FIG. 19.

The processor may also retrieve the operating time data for the selected processor cores as part of collecting the built in self test data. In block 518 the processor may calculate priorities for each of the selected processor cores based on the collected operation data and operating history in the same manner as in block 508. In block 526 the processor may update the hardware processor core priority in the virtual processor identification translation table as described above.

In another aspect, when the processor determines that the selected processor cores are inactive (i.e., determination block 504="Yes"), in optional determination block 520 the processor may optionally determine whether the computing device is in a cold boot and configured to boot quickly rather than running the built in self test for the selected processor cores in block 514. A cold boot may occur when the computing device boots from a powered down state. When the processor determines that the computing device is either not in a cold boot, or in a cold boot but is not configured to boot fast (i.e., optional determination block 520="No"), the processor may run the built in self test for the selected processor cores in block 514 and proceed as described above.

When the processor determines that computing device is in a cold boot and is configured to boot fast (i.e., optional determination block 520="Yes"), the processor may retrieve stored built in self test data or stored operational data, and the operating history for the selected processor cores from the nonvolatile memory in optional block 522. The nonvolatile memory may be the same memory used to store collected operational data in block 507 and/or the same memory used to store self test data in block 517. In an aspect, it may be possible for the processor to retrieve a combination of stored built in self test data and operational data for the selected processor cores. For example, the stored built in self test data or operational data for the selected processor cores may be incomplete, and the processor may supplement missing data with the other type of data when it is available. The processor may also make a determination that one of the built in self test data or operational data for one or more of the types of data, used in calculating the priorities of the processor cores, may be more recent and determine to use the more recent data for the one or more types of data. Additional aspects of retrieving stored built in self test data or stored operational data, and the operating history for the selected processor cores from the nonvolatile memory in optional block 522 are described herein with reference to block 1904 in FIG. 19.

In optional block 524 the processor may calculate priorities for each of the selected processor cores based on the retrieved stored data and operating history in the same manner as in blocks 508 and 518 as described above. In block 526 the processor may update the hardware processor core priority in the virtual processor identification translation table as described above.

In alternative aspects, the computing device or system may be configured so that the processor only uses self tests or run time measurements to determine how to reprioritize processor cores. In aspects that only use self tests, the operations of blocks 504 through 512 may not be performed, and the results of self tests stored in memory in 517 may be used at boot time to set initial processor priorities before the first self test can be performed as described above. In aspects that only use run time measurements to reprioritize processor cores, the operations of block 514 through 524 may not be performed and the results of run time measurements may be saved in nonvolatile storage so that results can be referenced in future boot cycles or during run time. In such aspects, the processor may be configured with a default processor core mapping (e.g., 0=0, 1=1, 2=2,3=3) that may be used upon an initial boot cycle before sufficient run time measurements have been stored in memory.

Figure 6:
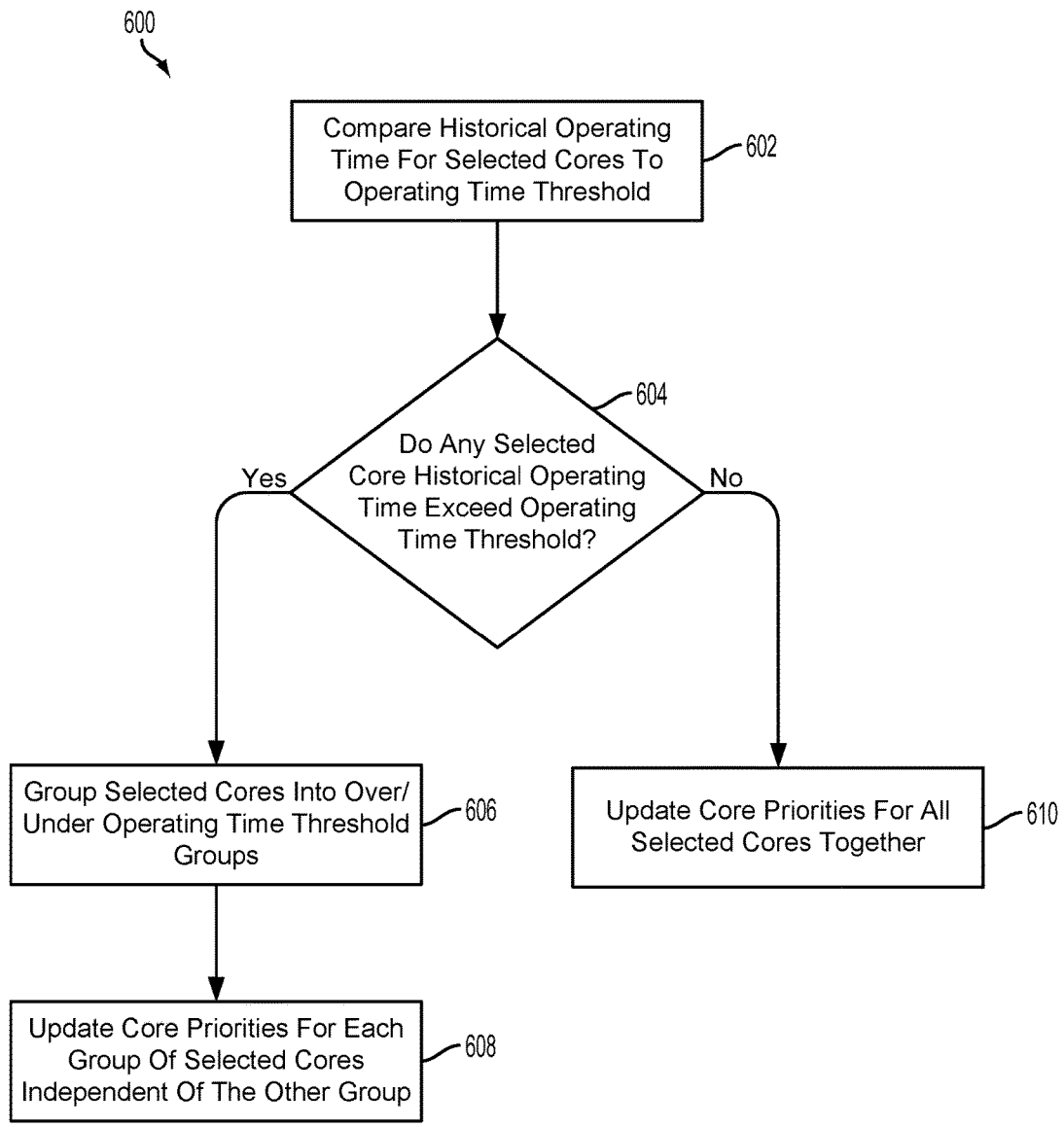
FIG. 6 is a process flow diagram illustrating an aspect method for determining when to update processor core priorities.

FIG. 6 illustrates an aspect method 600 for runtime optimization of multi-core system designs for increased operating life and maximized performance for a system including updated hardware. The processor executing the reliability engine may execute the method 600.

The addition of new processing hardware including new processor cores to the computing device, such as expansion, upgraded, replaced, or later added processor cores 326 illustrated in FIG. 3 (e.g., modem processors, additional or replacement graphics processors (GPUs), additional or replacement audio processors, and additional or replacement DSPs), may create an imbalance in the wear levels between the new processor cores and the older processor cores. Such a later-added/replaced/upgraded set of processor cores could be akin to a second CPU cluster 326 that may be optionally added (e.g., plugged into a pre-existing interface slot) sometime after sale of the computing device. The imbalance may be so great as to greatly prioritize the new processor cores over the older processor cores in an attempt to even the wear on the processor cores. However, this may defeat the purpose of adding new hardware, because new hardware is often added to increase the performance of the computing device by adding supplemental hardware. Prioritizing the new hardware above the old hardware until the hardware use levels even out may have the unintended effect of replacing the old hardware for a period of time rather than supplementing it. Thus, to avoid relying too heavily on the new hardware, in block 602 the processor executing the reliability engine may compare historical operating time for selected cores to an operating time threshold. The operating time threshold may be predetermined or calculated based on operating time data for the new and old processor cores. The operating time threshold may provide a demarcation line as to when new processor cores may be treated the same as the old processor cores. In determination block 604 the processor may determine whether any of the selected processor cores' historical operating time exceeds the operating time threshold. In other words, the processor may check to see whether any of the new processor cores are so new that they have not yet been run sufficiently to be comingled with the older processor cores for the purposes of determining the priority of equivalent processor cores.

When the processor determines that at least one processor core's historical operating time exceeds the operating time threshold (i.e., determination block "604"=Yes), in block 606 the processor may group the selected processor cores into over the threshold (or new) processor cores, and under the threshold (or old) processor cores. In block 608 the processor may execute the method 500 for each of the over the threshold and under the threshold groups of selected processor cores independently of the other group. Thus, for example, in block 602, the processor may select either the over the threshold or under the threshold groups of selected processor cores and execute the remaining blocks as described above. The processor may do the same for the group that was not selected first. In this aspect, the old and new processor cores are prioritized separately and compared only to other processor cores of similar ware. Thus, the processor cores in both the old and the new groups may be assigned processing requests from the high level operating system. When the processor determines that none of the processor core's historical operating time exceeds the operating time threshold (i.e., determination block "604"=No), in block 610 the processor may execute the method 500 for all of the selected processor cores together.

The method 600 may be particularly useful in a server environment where the operational times of the multi-core processors of a server are often higher than in a consumer device. Because servers are often employed in a commercial setting where server uptime may be critical to the functions supported by the server, the demand on the multi-core processors may be near constant. Servers are also often configured to be flexibly reconfigured for varying uses and levels of demand by adding, removing and replacing processing hardware. The addition and replacement of processing hardware in a server, such as adding or replacing multi-core processors, allows for servers to perform new tasks, more of the same tasks, or perform tasks better than before the additions. The high operational time of the multi-core processors of a server may result in large disparities between currently employed multi-core processors and newly introduced multi-core processors. As mentioned above, server systems may include compute servers, data servers, telecommunication infrastructure rack servers, video distribution servers, application specific servers, etc. Implementing method 600 in a server environment may increase the reliability of the servers resulting in a higher uptime, which is a critical aspect for server service providers and those who rely on server access.

Figure 7:
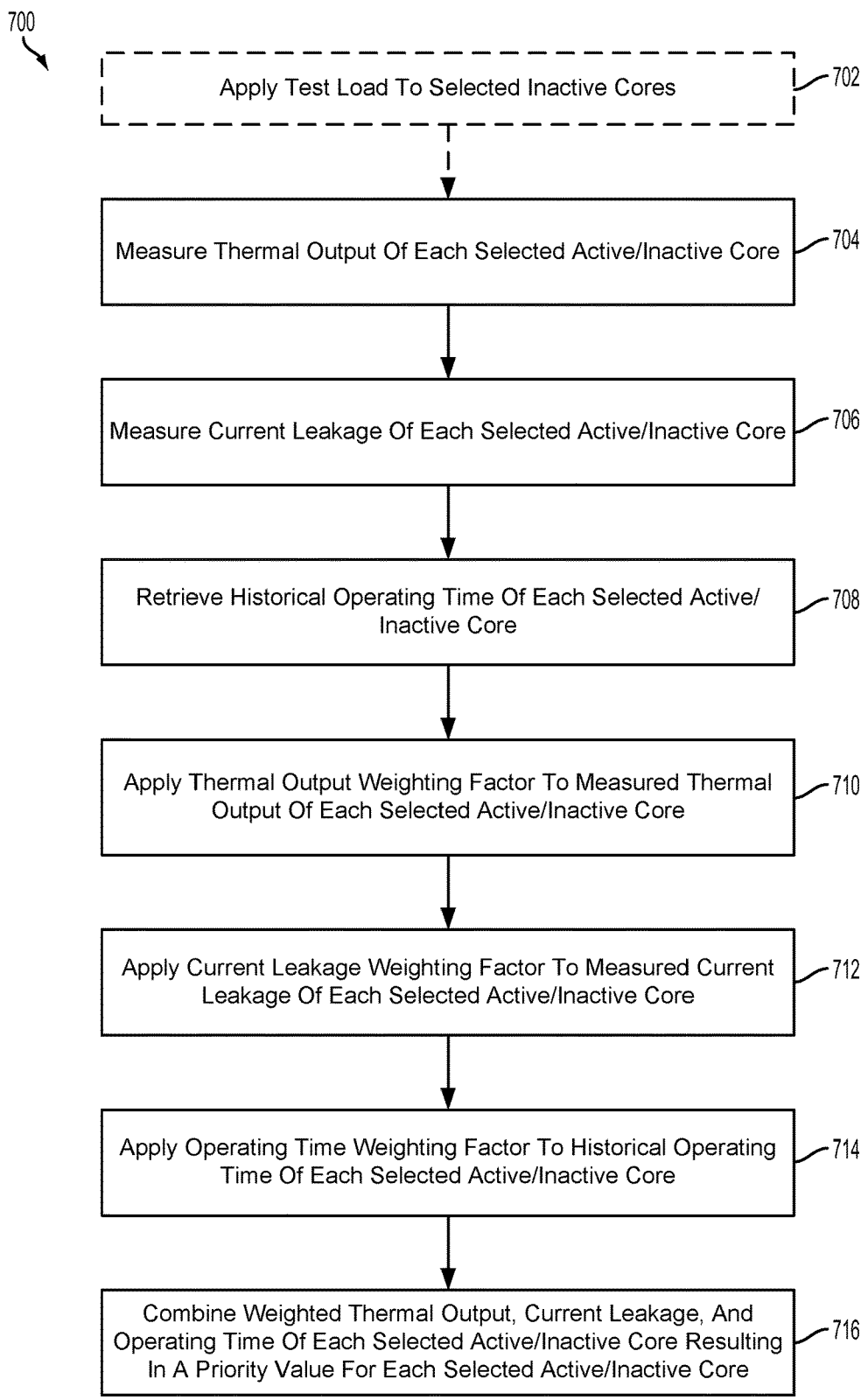
FIG. 7 is a process flow diagram illustrating an aspect method for collecting test/operation data and calculating processor core priorities.

FIG. 7 illustrates an aspect method 700 for collecting test/operation data and calculating processor core priorities. The processor executing the reliability engine may execute the method 700. This method 700 describes operations for collecting test/operation data and calculating processor core priorities in blocks 506, 508, 514 and 516 of method 500 described above with reference to FIG. 5. When the processor determines that the selected processor cores are inactive in determination block 504 (i.e., determination block 504 in method 500="Yes"), the processor may apply a test workload to the selected processor cores in block 702. The test workload may be a predetermined workload designed to cause certain behaviors in the processor cores. For example, the test workload may attempt to incite a normal work response from the processor cores by providing a normal workload. Similarly, the test workload may attempt to incite a heavy work response from the processor cores by providing them with a heavy workload of tasks. Different workloads may be designated for different types of processor cores, such as a graphic processing workload for graphics processor cores.

In block 704 the processor may measure the thermal output of each selected processor core based on data gathered during the self test in block 702 or based on data gathered from normal operations of the processor cores when the cores are active (i.e., determination block 504 in method 500="No"). For example, temperature data may be obtained from thermal sensors that may be strategically placed on a die of the multi-core processors containing the processor cores. Analysis of temperature data from a number of sensors may be used to calculate the thermal output of the individual processor cores. In an aspect in which the processor cores are placed so closely together that the thermal output of one or more of the processor cores affects another of the processor cores, it may be sufficient to observer the thermal output of the group of processor cores rather than each processor core individually. In such an aspect, it may be possible to reduce the number of thermal sensors required per processor core to observer the thermal output.

In block 706 the processor may measure the current leakage of each selected processor core. Current or voltage sensors may be strategically placed on a die of the multi-core processors containing the processor cores such that the voltage drop through the core or the amount of current consumed by the core may be observed and recorded. The current leakage may also be calculated based on the thermal output of the individual processor cores that may be observed using temperature sensors.

In block 708 the processor may retrieve the historical operating time of each selected processor core. As described above, the historical operating time may be retrieved from the memory, the storage component, the multi-core processor, or some other component dedicated to tracking and recording the historical operating time of the processor cores. The historical operating time may be presented in a number of different manners. In an aspect, the historical operating time may include a count value of the amount of time a processor core has been active (referred to herein as the "active time"). In an aspect, the historical operating time may include a relative active time value for the processor core that is based on a comparison (or relative measure) of the active time on the core compared the amount of active time of the other equivalent processor cores. For example, the historical operating time may be a percentage of the total operating time of all of the equivalent processor cores for which a particular operating core has been active.

In block 710 the processor may apply the thermal output weighting factor to the measured thermal output of each of the selected processor cores. In block 712 the processor may apply the current leakage weighting factor to the measured current leakage of each of the selected processor cores. In block 714 the processor may apply the operating time weighting factor to the historical operating time of each of the selected processor cores. For each of the weighting factors, the weighting factor may remain the same across the equivalent processor cores. For example, the thermal output weighting factor may be the same for each of the equivalent processor cores. In an aspect, the weighting factors may be the same or may vary for nonequivalent processor cores. For example, the thermal output weighting factor may or may not be the same for a general processor core as compared to a graphics processor core. In various aspects, applying the weighting factor to the measured or historical values may include using one or more of any number of mathematical operations. For example, the measured or historical values may be multiplied by their respective weighting factors.

In block 716 the processor may combine the weighted thermal output, the weighted current leakage, and/or the weighted historical operating time of each selected processor core individually, resulting in the priority value for each selected processor core. As described above, the combination of these values may be accomplished in a variety of forms. In various aspects, some or all of these values may be combined to produce the priority values for each selected processor core. In some aspects, some of the values may not be included in the combination by either not combining the discarded value through a mathematical operation with the other values, or by discounting the value by cancelling the value out using its respective weighting factor.

It should be noted that the different types of operational information regarding processor cores may be independent and thus may be obtained and processed in any order, and not necessarily in the order in which the operations are illustrated in FIG. 7. For example, a processor could sample current leakage upon boot up or system initialization only, and obtain temperature/thermal measurements periodically (e.g., hourly) thereafter and as part of normal operations. Therefore, the sequence of operations illustrated in FIG. 7 is for illustration purposes only and is not intended to limit the scope of the claims.

Figure 8:
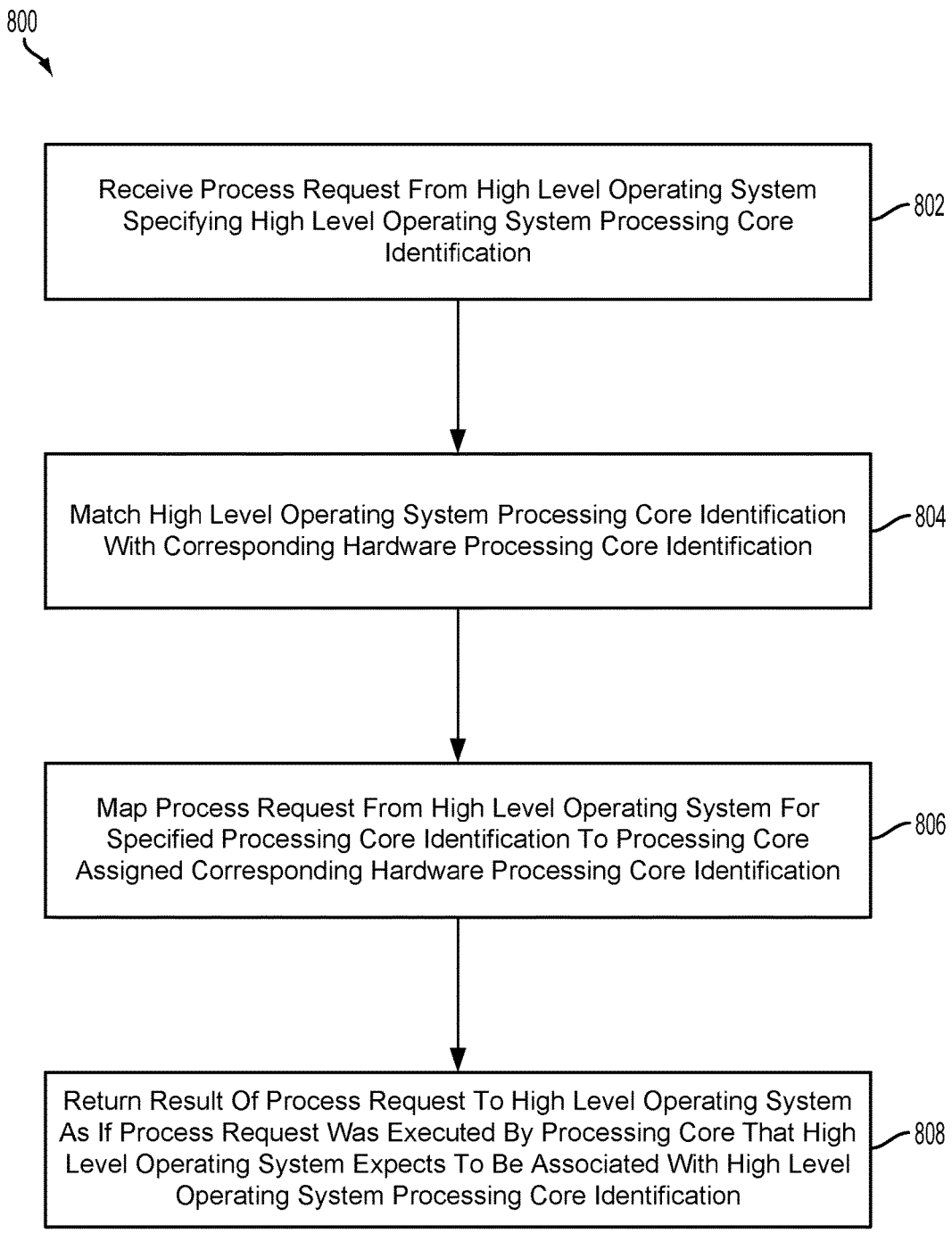
FIG. 8 is a process flow diagram illustrating an aspect method for translating a high level operating system processor core identification to a hardware processor core priority.

FIG. 8 illustrates an aspect method 800 for translating a high level operating system processor core identification to a hardware processor core priority. The processor executing the reliability engine may execute the method 800. In block 802, the processor may receive a process request from the high level operating system specifying a high level operating system processor core identification. In doing so, the high level operating system is expecting that the processor core identified by the high level operating system processor core identification will be assigned the process request. For example, an original pairing of virtual and physical processor core identifiers may pair virtual identifier processor core 0 with physical identifier processor core 0. However, if the processor cores are prioritized as illustrated in the priorities table in FIG. 4, the virtual identifier processor core 0 may be paired with physical identifier processor core 2.

In block 804 the processor may match the high level operating system processor core identification with the corresponding hardware processor core identification according to its priority. When the processor cores are prioritized and no longer matched with their original pairing of the high level operating system processor core identification, the processor may make the connection between the high level operating system processor core identification and the newly prioritized processor cores so that the process request made by the high level operating system is mapped to a processor core, and more specifically the appropriate processor core. However, the appropriate processor core may no longer be the processor core the high level operating system expects.

In block 806 the processor may map the process request from the high level operating system for the specified processor core identification to the processor core assigned the corresponding hardware processor core identification. The processor may map the processing request to the processor core now associated with the requested virtual processor core identifier. The associated processor core may be the processor core to execute the process request.

In block 808 the processor may return the result of the process request to the high level operating system as if the process request had been executed by the processor core identified by the high level operating system in the process request. By not informing the high level operating system of the change of priorities of the processor cores and managing the process requests without the high level operating system having to adjust for the changes may eliminate a layer of complexity in the high level operation system, and reduce costs that might otherwise be necessary to implement the aspects in the operating system.

FIG. 9 illustrates an aspect method 900 for updating weighting values for use in runtime optimization of multi-core system designs for increased operating life and maximized performance. A computer within the manufacturer may execute at least some operations of the method 900. Manufactures may learn about performance characteristics of the processor cores during manufacturing and then use the data to adjust the processor cores in use to rectify issues, such as inefficiencies and uneven heat cycling, that were not detected during testing phases of the processor cores. For example, as a manufacturer ramps up production of integrated circuits in a new process, the manufacturer typically learns things about variability and performance of processor cores during the tuning of the wafer fabrication process. Such learning may lead the manufacturer to revise already fielded devices, such as by transmitting updated parameters in over-the-air updates for computing devices implementing integrated circuits from previously fabricated lots. As another example, failed consumer products may be returned to the manufacturer, such as according to the well-known Return Merchandise Authorization (RMA) process. Returned merchandise may be analyzed to discover a pattern of issues that lead to device failures that prompted the merchandise returns. Through the analysis of failures in returned merchandise the manufacturer may determine that it can improve the failure rates and longevity of its processor cores by updating the weighting values to alter the wear on the processor cores.

In block 902 the manufacturer may receive and analyze returned merchandise to determine causes of failures and failure rate data. This data may include customer comments and technical analysis of potentially defective or broken processor cores obtained pursuant to the RMA process. In an aspect, in block 904 the manufacturer may also receive operation and test data of the processor cores from functioning computing devices via communications over a wired or wireless connection.

In block 906 the manufacturer may analyze the return merchandise analysis data and operation and test data if received to determine causes of component failures. In block 908 the manufacturer may determine updates for one or more of the weighting factors for the processor cores using the received data that may avoid the causes of the failures of the components. The weighting factors may be modified to place greater or less importance on one or more of the data relating to the processor cores to skew the prioritization of cores in a manner that is expected to lead to better or more even wearing of the processor cores.

In block 910 the manufacturer may send the updated weighting factors to the computing device over a wired or wireless connection, such as in the form of an over-the-air update to a computing device, an in-store update accomplished by a technician, or an update that is downloaded from an Internet server to a computing device (e.g., a desktop or laptop computer) over a wired or wireless network connection to the Internet. Sending such updates may be accomplished using a targeted or broadcast push of data to the computing device, or the computing device may be notified of the update and requested to download (i.e., pull) the update from an Internet server.

FIG. 10 is a process flow diagram illustrating an aspect method for updating weighting values for use in runtime optimization of multi-core system designs for increased operating life and maximized performance. In an associated method 1000 to method 900, the computing device may send and receive data to the manufacturer in order to update the weighting values.

In block 1002 the computing device may send operation and test data to the manufacturer over a wireless connection. Sending this data may be optional because either the computing device and/or the manufacturer is not setup for the transmission of this data, or optional as a user option on the computing device.

In block 1004 the computing device may receive the updated weighting factors for one or more of the thermal output, the current leakage, and the operating time. The received updated weighting factors may be dependent on the updated weighting factors sent or made available to the computing device, and/or the updated weighting factors accepted by the computing device and/or user.

In block 1006 the processor executing the reliability engine may replace the weighting factors with the update weighting factors. In an aspect, some or all of the old weighting factors may be deleted, disassociated from their pointers, or overwritten when updated with the new weighting factors. The updated factors may be used at the next time the processor cores are prioritized.

Figure 14:
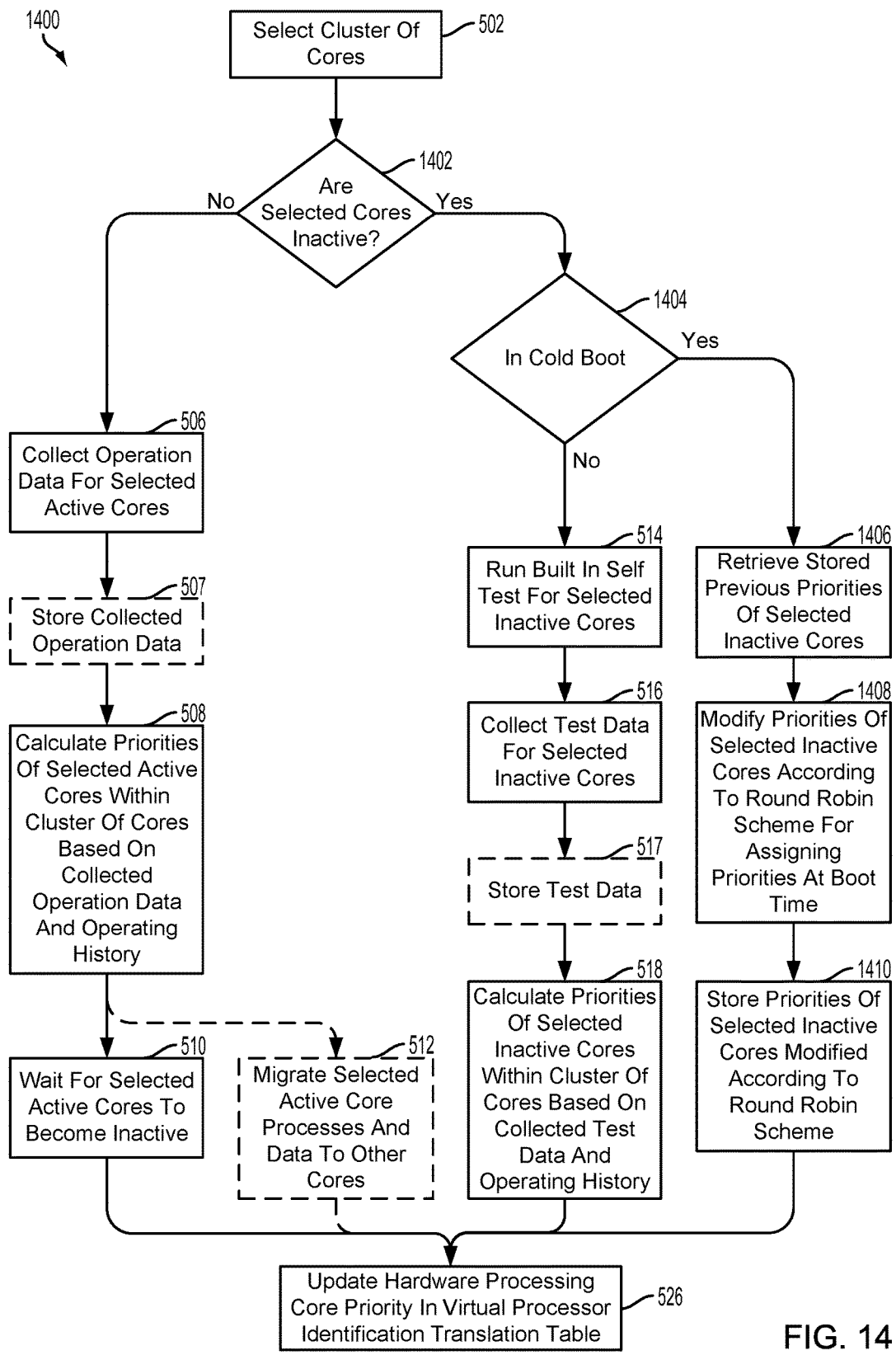
FIG. 14 is a process flow diagram illustrating an aspect method for determining priorities for processor cores.

FIG. 14 illustrates an aspect method 1400 for prioritizing processor cores at boot time based on a round robin scheme. A processor executing the reliability engine may execute the method 1400. The operations of the method 1400 include operations similar to those of the method 500 described above with reference to FIG. 5. In particular, the operations in blocks 502, 506, 507, 508, 510, 512, 514, 516, 517, 518, and 526 may be similar to the operations described above with reference to FIG. 5 for like numbered blocks.

In block 502 the processor may select a cluster, or group, of equivalent processor cores. As previously described, equivalent processor cores may be configured for the same purpose and to have the same performance characteristics, though the performance characteristics may vary due to manufacturing variability. Thus, the processor may select a group of processor cores configured for the same purpose. For example, the processor may select a group of general purpose processor cores, or groups of graphics or digital signaling processor cores, respectively. When there are multiple equivalent processors, the group of equivalent processor cores may extend across the multiple equivalent processors, or the group may be confined to equivalent processor cores of a single processor.

In determination block 1402, the processor may determine whether the selected processor cores are inactive, idle, or in a quiescent state. This determination may affect how the processor implements data gathering and prioritization of the processor cores. In response to determining that the selected processor cores are active (i.e., determination block 1402="No"), the processor may implement the operations in blocks 506-512 and 526 as described above. In response to determining that the selected processor cores are inactive (i.e., determination block 1402="Yes"), the processor may determine whether the computing device is in a cold boot in determination block 1404. A cold boot may occur when the computing device boots from a powered down state. In response to determining that the computing device is not in a cold boot (i.e., determination block 1404="No"), the processor may implement the operations in block 514-518 and 526 as described above.

In response to determining that the computing device is in a cold boot (i.e., determination block 1404="Yes"), the processor may retrieve from the non-volatile memory previously stored priorities for the selected inactive processor cores in block 1406. In an aspect, the previously stored priorities for the currently selected inactive processor cores may include any priority assigned to the selected inactive processor cores during any previous assignment of priorities. For example, the previously stored priorities may include priorities used by the processor in block 526 to update the hardware processor core priority in the virtual processor identification translation table as described above. In an aspect, the previously stored priorities for the currently selected inactive processor cores may include priorities assigned to the selected inactive processor cores and stored in memory during previous assignments of priorities during boot time according to a round robin scheme, such as in block 1410 as described below.

In an aspect, in determination block 1404, the processor may determine whether the computing device is configured to boot quickly in addition to determining whether the computing device is in a cold boot. In response to determining that the computing device is in a cold boot but is not configured to boot quickly (i.e., determination block 1404="No"), the processor may implement the operations in block 514-518 and 526 as described above. In response to determining that the computing device is in a cold boot and is configured to boot quickly (i.e., determination block 1404="Yes"), the processor may retrieve from the non-volatile memory previously stored priorities for the selected inactive processor cores in block 1406 as described above.

In block 1408, the processor may modify the priorities of the selected inactive processor cores according to a round robin scheme for assigning priorities at boot time. In an aspect, the round robin scheme may include shifting the priority of each of the selected inactive processor cores by a specified amount, such as by incrementing or decrementing the priority by that amount. The specified amount by which the priority is shifted may be any amount that results in the selected inactive processor cores having priorities different from the previously stored priorities for the currently selected inactive processor cores. In an example with four processing cores (processing core 0, processing core 1, processing core 2, and processing core 3), the last known priorities (from highest to lowest) of the processing cores retrieved from memory during boot time may be: processing core 2, processing core 1, processing core 3, and processing core 0. Using the round robin scheme to assign priorities to the processing cores at boot time may shift the priority of each processing core to the next highest priority, with the previous highest priority processing core becoming the lowest priority processing core. The new priorities (from highest to lowest) may be: processing core 1, processing core 3, processing core 0, and processing core 2. The round robin scheme may also shift the priorities of processing cores to the next lowest priority, with previous lowest priority processing core becoming the highest priority processing core. In this example, the new priorities (from highest to lowest) may be: processing core 0, processing core 2, processing core 1, and processing core 3.

In an aspect, not all of the priorities may be modified or modified by the same amount. For example, there may be a gap in the previously stored priorities between two of the selected inactive processor cores, such as one priority designation. The round robin scheme may be implemented to modify the priorities of the selected inactive processor cores such that the gap in the priorities is filled. In an aspect, filling the gap may be accomplished by modifying the priorities of the selected inactive processor cores on only a first side of the gap in the priorities. In an aspect, filling the gap may be accomplished by modifying the priorities of the selected inactive processor cores on the first side of the gap in the priorities by a greater amount than on a second side of the gap in the priorities.

In block 1410, the processor may store in non-volatile memory the priorities of the selected inactive processor cores modified according to the round robin scheme. The priorities of the selected inactive processor cores may be stored in the non-volatile memory so that they may be retained by the computing device even when the computing device is not powered (e.g., as part of a cold boot process). For example, the stored priorities may be accessed when the computing device is powered up during a cold boot in block 1406 as described above. The processor may update the hardware processor core priority in the virtual processor identification translation table in block 526 as described above.

Implementing the round robin scheme for modifying priorities to the selected inactive processor cores based on previously stored priorities may avoid repeated or uneven assignment of higher priorities to the processor cores. Varying the priorities assigned to the processor cores may more evenly distribute the use of the processor cores, thereby extending the life of the processor cores and the performance of the computing device.

Figure 15:
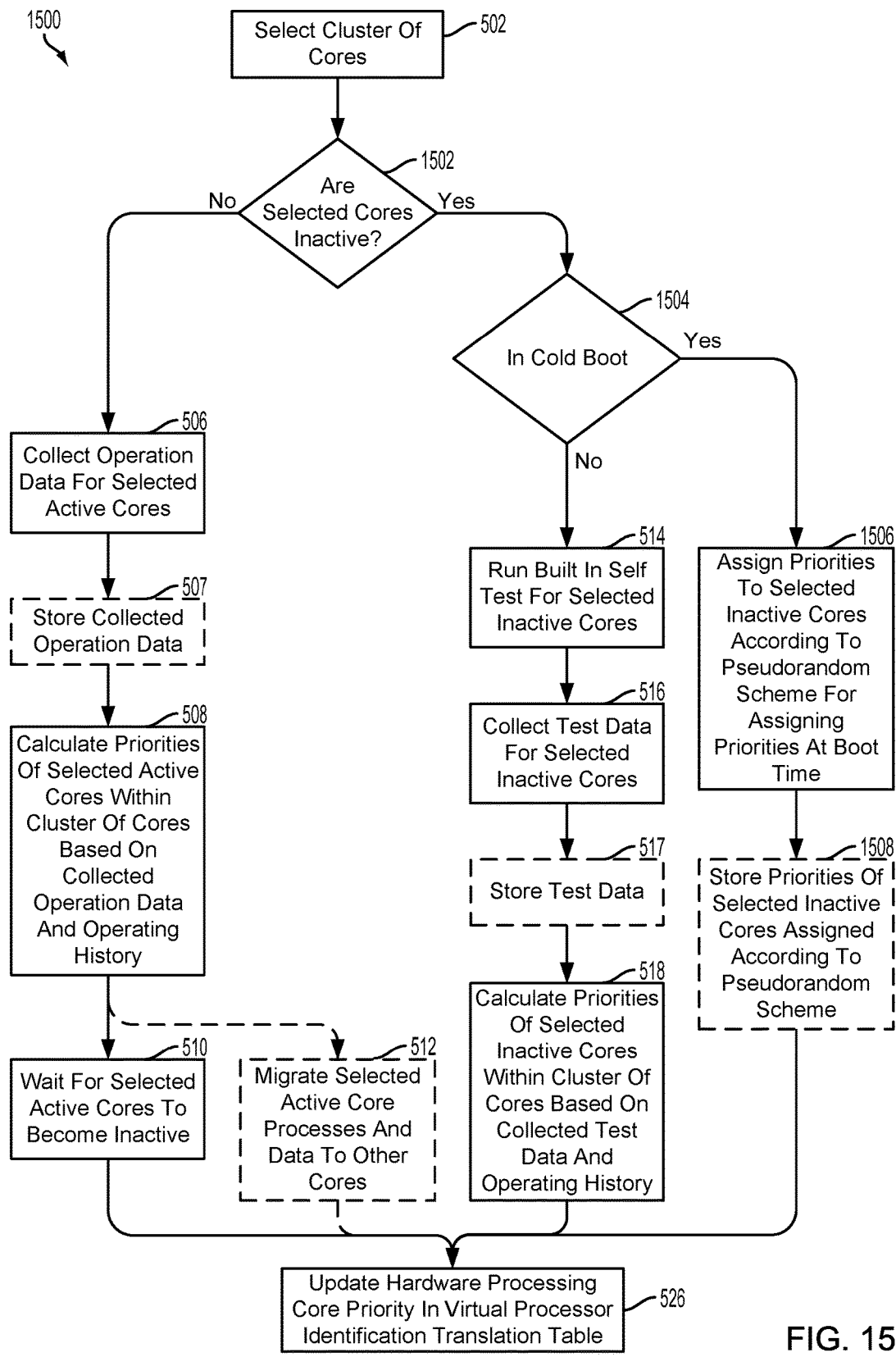
FIG. 15 is a process flow diagram illustrating an aspect method for determining priorities for processor cores.

FIG. 15 illustrates an aspect method 1500 for prioritizing processor cores at boot time based on a pseudorandom assignment scheme. A processor executing the reliability engine may execute the method 1500. The operations of the method 1500 include operations similar to those of the method 500 described above with reference to FIG. 5. In particular, the operations in blocks 502, 506, 507, 508, 510, 512, 514, 516, 517, 518, and 526 may be similar to the operations described above with reference to FIG. 5 for like numbered blocks.

In block 502 the processor may select a cluster, or group, of equivalent processor cores. As previously described, equivalent processor cores may be configured for the same purpose and to have the same performance characteristics, though the performance characteristics may vary due to manufacturing variability. Thus, the processor may select a group of processor cores configured for the same purpose. For example, the processor may select a group of general purpose processor cores, or groups of graphics or digital signaling processor cores, respectively. When there are multiple equivalent processors, the group of equivalent processor cores may extend across the multiple equivalent processors, or the group may be confined to equivalent processor cores of a single processor.

In determination block 1502, the processor may determine whether the selected processor cores are inactive, idle, or in a quiescent state. This determination may affect how the processor implements data gathering and prioritization of the processor cores. In response to determining that the selected processor cores are active (i.e., determination block 1502="No"), the processor may implement the operations in blocks 506-512 and 526 as described above. In response to determining that the selected processor cores are inactive (i.e., determination block 1502="Yes"), the processor may determine whether the computing device is in a cold boot in determination block 1504. As described above, a cold boot may occur when the computing device boots from a powered down state. In response to determining that the computing device is not in a cold boot (i.e., determination block 1504="No"), the processor may implement the operations in blocks 514-518 and 526 as described above.

In response to determining that the computing device is in a cold boot (i.e., determination block 1504="Yes"), the processor may assign priorities to the selected inactive processor cores according to a pseudorandom scheme for assigning priorities at boot time in block 1506. The pseudorandom scheme may include an algorithm for selecting a priority for each of the selected inactive processor cores. The priorities may be selected such that no two selected inactive processor cores are assigned the same priority. The pseudorandom scheme may select priorities from a limited set of priorities based on factors such as the number of selected inactive processor cores. Values for the priorities of the pseudorandom scheme may directly or indirectly relate to the priorities assigned to the selected inactive processor cores. For example, when the values for the priorities of the pseudorandom scheme directly relate to the priorities assigned to the selected inactive processor cores, the values may be equivalent to the assigned priority. In another example, when the values for the priorities of the pseudorandom scheme indirectly relate to the priorities assigned to the selected inactive processor cores, the values may indicate an order of priority but the priorities themselves may be assigned according to priorities available to the selected inactive processor cores.

In an aspect, previously stored priorities may be used by the pseudorandom scheme to avoid repeated or uneven assignment of higher priorities to the same processor cores. In an aspect, the previously stored priorities for the currently selected inactive processor cores may include any priority assigned to the selected inactive processor cores during any previous assignment of priorities. For example, the previously stored priorities may include priorities used by the processor in block 526 to update the hardware processor core priority in the virtual processor identification translation table as described above. In an aspect, the previously stored priorities for the currently selected inactive processor cores may include priorities assigned to the selected inactive processor cores during previous assignments of priorities during boot time according to the pseudorandom scheme.

In an aspect, in determination block 1504, the processor may determine whether the computing device is configured to boot quickly in addition to determining whether the computing device is in a cold boot. In response to determining that the computing device is in a cold boot but is not configured to boot quickly (i.e., determination block 1504="No"), the processor may implement the operations in blocks 514-518 and 526 as described above. In response to determining that the computing device is in a cold boot and is configured to boot quickly (i.e., determination block 1504="Yes"), the processor may assign priorities to the selected inactive processor cores according to a pseudorandom scheme for assigning priorities at boot time in block 1506 as described above.

In optional block 1508, the processor may store in non-volatile memory the priorities of the selected inactive processor cores assigned according to the pseudorandom scheme. The priorities of the selected inactive processor cores may be stored in the non-volatile memory so that they may be retained by the computing device even when the computing device is not powered (e.g., as part of a cold boot process). For example, the stored priorities may be accessed when the computing device is powered up during a cold boot in block 1506 as described above. The processor may update the hardware processor core priority in the virtual processor identification translation table in block 526 as described above.

Figure 16:
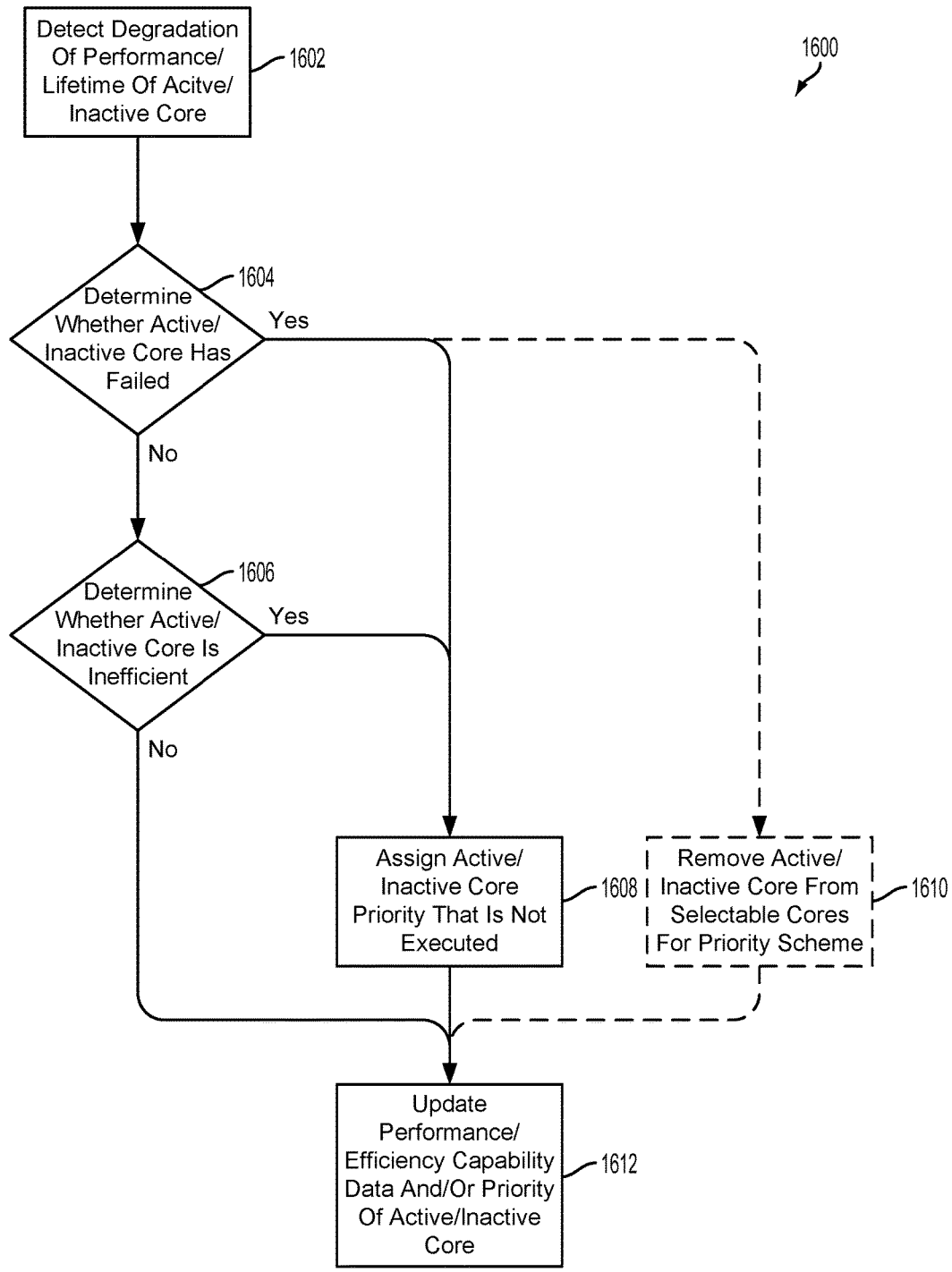
FIG. 16 is a process flow diagram illustrating an aspect method for determining usability of processor cores.

FIG. 16 illustrates an aspect method 1600 for determining usability of processor cores. The processor executing the reliability engine may execute the method 1600. The method 1600 may be included as a part of, or in addition to, the methods 500, 1400, and 1500 of FIGS. 5, 14, and 15, respectively. In an aspect, the method 1600 may be executed as part of block 508, 518, 524, 526, and/or 1408 of FIGS. 5, 14, and 15, respectively. In block 1602, the processor may detect degradation of performance and/or lifetime of the active or inactive processor cores. In an aspect, detecting such degradation may result from comparing collected operational data and/or self test data against previous collected operational data and/or self test data, or against expected values/thresholds based on known characteristics of the processor cores. In an aspect, detecting degradation of performance and/or lifetime may be a function of the historical operating time of the processor cores. Such a function may include any combination of the historical operating time and historical operational data and/or self test data. In an aspect, historical priorities assigned to the processor cores may be used it detect degradation of performance and/or lifetime. For example, a historical trend of reducing or consistently low priorities for a processor core may indicate that the processor core is exhibiting poor operational and/or self test data.

In determination block 1604, the processor may determine whether the active or inactive processor core, for which degrading performance and/or lifetime is detected, has failed. In an aspect, criteria similar to that used for detecting degradation may be used to determine failure; however, failure may be determined based on the severity of the degradation. Thus, the results of the above analyses of the operational data and/or self test data, historical operating time, or historical priorities may lead to determining that the core has failed in response to certain levels of degradation. A lack of data for conducting the degradation analyses may also indicate failure of a processor core.

In response to determining that the active or inactive processor core has not failed (i.e., determination block 1604="No"), the processor may determine whether the active or inactive processor core is inefficient in determination block 1606. In an aspect, criteria similar to that used for detecting degradation and failure may be used to determine inefficiency; however, inefficiency may be determined based on the severity of the degradation. In an aspect, the efficiency/inefficiency of the processor core may be related to its power consumption and/or performance. For example, the processor may determine that a processor core is inefficient when the determined severity of degradation is between or equal to either of a minimum severity for detecting degradation for the processor core and a minimum severity for determining failure of the processor core.

In response to determining that the active or inactive processor core is efficient (i.e., determination block 1606="No"), the processor core may update performance, efficiency, or capability data, and/or the priority of the active or inactive processor core in block 1612. In an aspect, the performance, efficiency, or capability data, and/or the priority may be stored (e.g., in a database) for use by algorithms that schedule tasks to processor cores, and to manage use of the processor core in the system. For example, the performance, efficiency, or capability data, and/or the priority of the processor core exhibiting degradation of performance and/or lifetime may be used to indicate that the priority assigned to the processor core should capped at a certain priority so that it is used less often. Similarly, the data and/or the priority may be used to adjust the calculated priority for the processor core to reduce it by an amount corresponding to the severity of the degradation.

In response to determining that the active or inactive processor core has failed (i.e., determination block 1604="Yes"), the processor may assign the processor core a priority that will not be executed in block 1608. In an aspect, rather than assigning the processor core a priority that will not be executed, the processor may remove the active or inactive processor core from the pool of selectable processor for assigning tasks in optional block 1610. The processor may update the performance, efficiency, or capability data, and/or the priority of the active or inactive processor core in block 1612.

In response to determining that the active or inactive processor core is inefficient (i.e., determination block 1606="Yes"), the processor may assign the processor core a priority that will not be executed in block 1608. The processor may update the performance, efficiency, or capability data, and/or the priority of the active or inactive processor core in block 1612.

Figure 17:
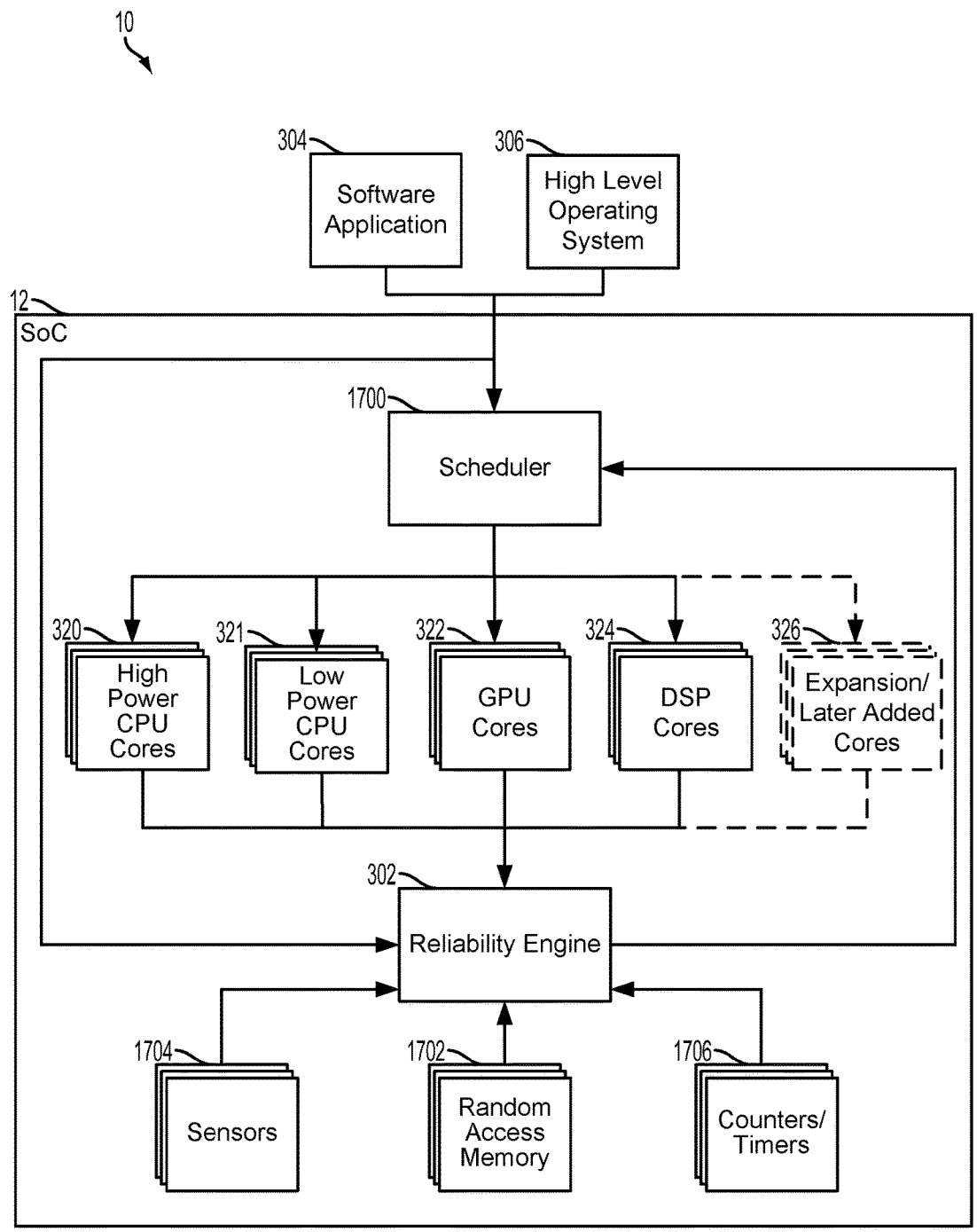
FIG. 17 is a functional and component block diagram of a system-on-chip suitable for implementing an aspect.

FIG. 17 illustrates a computing device 10 having an SoC 12 including multiple processor cores 320, 321, 322, 324, 326, and a reliability engine 302 for runtime optimization of multi-core system designs for increased operating life and maximized performance, as described herein with reference to FIG. 3, in accordance with an aspect. The computing device 10 may include the SoC 12 having the processor cores 320, 321, 322, 324, 326, the reliability engine 302, a scheduler 1700, any number of random access memory (RAM) 1702, any number of sensors 1704, and any number of counters and/or timers 1706.

In various aspects, any number and combination of the multiple processor cores 320, 321, 322, 324, 326 may be included in different types of multi-core processors (e.g., multi-core processor 14 in FIGS. 1 and 2). A multi-core processor may have a plurality of homogeneous or heterogeneous processor cores 320, 321, 322, 324, 326. In various aspects, the SoC 12 may include any number and combination of homogeneous and/or heterogeneous multi-core processors.

A homogeneous multi-core processor may include a plurality of homogeneous processor cores. The processor cores 320, 321, 322, 324, 326 may be homogeneous in that the processor cores 320, 321, 322, 324, 326 of the multi-core processor may be configured for the same purpose and have the same or similar performance characteristics. For example, the multi-core processor may be a general purpose processor, and the processor cores 320, 321, 326 may be homogeneous general purpose processor cores. The multi-core processor 14 may be a GPU or a DSP, and the processor cores 322, 324, 326 may be homogeneous graphics processor cores or digital signal processor cores, respectively. The multi-core processor may be a custom hardware accelerator with homogeneous processor cores 320, 321, 322, 324, 326.

A heterogeneous multi-core processor may include a plurality of heterogeneous processor cores. The processor cores 320, 321, 322, 324, 326 may be heterogeneous in that the processor cores 320, 321, 322, 324, 326 of the multi-core processor may have a different design, be configured for different purposes and/or have different performance characteristics. The heterogeneity of such heterogeneous processor cores may include different instruction set architectures, pipelines, operating frequencies, etc. An example of heterogeneous processor cores may include what is known as a "big.LITTLE" architecture in which slower, low-power processor cores may be coupled with more powerful and power-hungry processor cores. In various aspects, the heterogeneous multi-core processor may not require that all off its processor cores 320, 321, 322, 324, 326 be heterogeneous processor cores, as the heterogeneous multi-core processor may include any combination of processor cores 320, 321, 322, 324, 326, including at least one heterogeneous processor core.

For the sake of brevity and ease of explanation, the processor cores 320, 321, 322, 324, 326, the multi-core processors, and the random access memory 1706, individually or collectively, are referred to herein as "computing device components."

The sensors 1704 may be configured to sense and/or measure condition parameters. Similarly, the counters and/or timers 1706 may be configured to count and/or measure condition parameters. In various aspects, the sensors 1704 and/or counters and/or timers 1706 may be configured for sensing, measuring, counting, and/or timing condition parameters for any number of criteria for any number of computing device components. In various aspects, the sensors 1704 and/or counters and/or timers 1706 may be configured for sensing, measuring, counting, and/or timing condition parameters during normal operation of the computing device components and/or during execution of a built in self test of the computing device components. Examples of condition parameters include voltage level, operating frequency, aging, thermal output (indicative of thermal behavior, including thermal resistance, thermal capacitance, temperature sensor measurement, thermal cycling, etc.), use (including for workload types and executed functions), performance, faults or errors, and/or time. Condition parameter data may be used to estimate a condition of a computing device component, such as aging.

The condition parameter data may be stored in various formats, data structures, and/or databases in a memory (e.g., memory 16, 24, in FIG. 1). In various aspects, the condition parameter data may be stored as discrete instances, cumulative instances, rates of instances of occurrence of the condition parameters, and/or changes in occurrence of the instances and/or rates of instance of occurrence of the condition parameters. The condition parameter data may be stored in a manner that correlates various types of condition parameters with each other. For example, various thermal outputs, voltages, frequencies, operating times, executed functions, workload types, and/or errors for a computing device component may be stored in a correlated manner so that different combinations of correlated thermal outputs, voltages, frequencies, operating times, executed functions, workload types, and/or errors for the computing device component may be retrieved from the memory. Stored condition parameter data may be updated based on later sensing, measuring, counting, and/or timing of the condition parameters satisfying the same conditions.

The sensors 1704 may include voltage and/or frequency sensors, which may be configured to sense and/or measure voltage level and/or operating frequency for a computing device component. In various aspects, the voltage levels may include voltage droop levels or active voltage modulation events. In various aspects, the voltage droop levels may be used to compare with known rail voltage settings for the computing device component. The sensors 1704 configured to sense and/or measure voltage level may include sensors 1704 configured to sense and/or measure silicon aging of the computing device component, as discussed further herein, which may be used to maintain noise margins within a proper operating range.

The sensors 1704 may include aging sensors configured to sense and/or measure silicon aging of a computing device component. For example, the sensors 1704 may include a ring oscillator used to measure a speed of silicon so that a voltage needed to drive timing closure on the ring running at a designated frequency may be determined. As silicon ages its electrical conductance slows and more voltage is needed to drive timing closure. An output of a ring oscillator may be connected to an analog sensor that may detect aging in the silicon from changes in the voltage required to drive the timing closure.

The sensors 1704 may include thermal resistance sensors (e.g., resistance thermometers or resistance temperature detectors), thermal capacitance sensors (e.g., capacitance temperature sensors), and/or temperature sensors (e.g., thermistors) configured to sense and/or measure temperature of a computing device component. For the sake of brevity and simplicity of explanation, the thermal resistance sensors, thermal capacitance sensors, and temperature sensors, individually or collectively, are referred to herein as "temperature sensors." Temperature sensors may be configured to sense and/or measure temperature of the computing device component or of the material and or space in close proximity to the computing device component. Temperature sensors may be configured to sense and/or measure temperature of any number of computing device components, such as in one to one, one to many, many to one, and many to many relationships.

The counters and/or timers 1706 may be configured to count the number of times and/or duration of use of a computing device component. Counting the number of times and/or duration of use of a computing device component may be triggered by each use or specific uses of the computing device component, including using specific locations, executing designated functions, and/or types of workloads. For example, counters and/or timers 1706 may be triggered based on use of memory locations, computing circuits, float work, integer work, and/or string work. In various aspects, the counters and/or timers 1706 may use absolute system time of the computing device as a reference for counting the number of times and/or duration of use of a computing device component.

The counters 1706 may be configured to count the number of times that error and/or faults occur for a computing device component. For example, the counters 1706 may count the number of bit errors occurring in the random access memory 1702, such as for specific blocks of the random access memory 1702; errors occurring at the random access memory interface, such as for double data rate fourth-generation (DDR4) random access memory and/or low power double data rate fifth-generation (LPDDR5) random access memory; and/or errors occurring in processing by a processor core 320, 321, 322, 324, 326, such as incorrect computations.

In various aspects, the counters and/or timers 1706 may be used in conjunction with the sensors 1704 and may be configured to count the number of times and/or duration of sensed and/or measured condition parameters. In various aspects, the sensors 1704 and/or counters and/or timers 1706 may be incorporated into and/or positioned within an operative distance from the processor cores 320, 321, 322, 324, 326, the multi-core processors, and/or the random access memory 1702.

In various aspects, different criteria, such as thresholds, ranges, and/or types of sensed, measured, counted, and/or timed condition parameters, may be used to trigger sensing, measuring, counting, and/or timing of condition parameters, and/or to correlate the condition parameter data during normal operation and/or during execution of a built in self test of a computing device component. In various aspects, sensing, measuring, counting, and/or timing of condition parameters may be triggered by execution of a built in self test of the computing device component. A built in self test of a computing device component may be executed on a schedule and/or in response to the different criteria. A built in self test may be executed for a computing device component during an idle, an inactive, or a quiescent state of the computing device component, such as during a boot time of the computing device component, following completion of a task by the computing device component, and/or during interruption of a task executed by the computing device component.

In various aspects, sensing, measuring, counting, and/or timing of condition parameters may be influenced by environmental factors, such as condition parameters exhibited by other computing device components that alter the condition parameters of the computing device component and/or the condition parameters sensed, measured, counted, and/or timed the sensors 1704 and/or counters and/or timers 1706. For example, thermal outputs of other computing device components may affect thermal outputs of a computing device component or the thermal outputs sensed, measured, counted, and/or timed for the computing device component. Differences in thermal outputs may be exhibited for computing device components in different states while in close enough proximity that thermal outputs of a currently or more recently active computing device component may affect or be affected by a less recently active computing device component.

The reliability engine 302 may be configured to receive signals indicating the sensed, measured, counted, and/or timed condition parameters from the sensors 1704, and/or the counters and/or timers 1706, and update and/or store data for the condition parameters. The signals may include condition parameter data, such sense signals, measurements, counts, time, identifiers for the criteria for the condition parameters, and/or identifiers for the computing device components. In various aspects, the identifiers may be implemented for the sensors 1704 and/or counters and/or timers 1706 configured for multiple criteria and/or computing device components. The reliability engine 302 may be configured to store the condition parameter data in various formats, data structures, and/or databases, correlating various types of condition parameters with each other according to various criteria. The reliability engine 302 may be configured to update the stored condition parameter data with received condition parameter data.

The reliability engine 302 may be configured to compare condition parameters of the received signals from multiple computing device components and/or compare condition parameters of the received signals for a computing device component with the stored condition parameters for the computing device component. From the comparisons, the reliability engine 302 may determine whether the condition parameters of a computing device component are affected by environmental factors. In various aspects, to correct for the condition parameters affected by environmental factors, the reliability engine 302 may normalize the affected condition parameters based on various algorithms.

In various aspects, condition parameters for the computing device component exhibiting the affected condition parameters that condition parameters may be obtained under different environmental influences. For example, condition parameters for a computing device component obtained in a hot environment may be corrected by later obtaining condition parameters for the computing device component in a cooler environment. The condition parameters obtained while the computing device operated in the cooler environment may be used to update the stored condition parameter data that includes condition parameter data obtained while the computing device operated in the hot environment.

In various aspects, the reliability engine 302 may trigger sensing, measuring, counting, and/or timing of condition parameters for the computing device component exhibiting the affected condition parameters so that condition parameters may be obtained under the different environmental conditions or influences. In various aspects, the reliability engine 302 may trigger obtaining the condition parameters in response to the environmental influences on the computing device component and/or after a period during which the condition parameters under the different environmental conditions or influences are not obtained. In various aspects, the reliability engine 302 may configure other computing device components to control the environmental influences on the computing device component for obtaining the condition parameters under the different environmental conditions or influences. In various aspects, the reliability engine 302 may trigger execution of a built in self test for the computing device component to obtain the condition parameters under the different environmental conditions.

The reliability engine 302 may be configured to use the condition parameter data for a computing device component to calculate a condition estimator for the computing device component. In various aspects, different condition parameters may be used to calculate a condition estimator to indicate an estimated condition of a computing device component, such as age, rate of aging, stress, reliability, likelihood of failure, estimated interval to failure, etc. For example, a condition estimator may indicate an estimation of age of a computing device component using a function of an amount of time the computing device component is run at various combinations of voltages and temperatures. As another example, the condition estimator may indicate an estimation of stress of a computing device component or part of a computing device component, such as a certain circuit, based on a function of a number of times certain types of workloads are executed by the computing device component. As another example, the condition estimator may indicate an estimation of reliability of a computing device component or part of a computing device component, such as a certain processor core 320, 321, 322, 324, 326, multi-core processor, memory location, or memory interface input/output (I/O), based on a function of a number of times an error and/or fault occurs for the computing device component over multiple time periods.

In various aspects, the reliability engine 302 may be configured to use the condition parameter data for a computing device component to determine failure of a computing device component. The reliability engine 302 may initiate reboot and self testing of a suspected failed computing device component to confirm failure of the computing device component. Returned condition parameter data of the self test on the computing device component may be used to confirm or refute the suspected failure of the computing device component.

The scheduler 1700 may be configured to receive the condition estimators calculated by the reliability engine 302, and to use the condition estimators to manage use and operation of the computing device components. The scheduler 1700 may be configured to assign the computing device components for use and to specify configurations of the computing device components for use as discussed further herein.

The scheduler 1700 may be configured to assign workloads to and configure the processor cores 320, 321, 322, 324, 326 and the multi-core processors. The scheduler 1700 may use the received condition estimators to assign preferences for and workloads to the processor cores 320, 321, 322, 324, 326 and the multi-core processors to balance aging among the processor cores 320, 321, 322, 324, 326, and the multi-core processors. The scheduler 1700 may use the received condition estimators to configure the functional aspects of the processor cores 320, 321, 322, 324, 326, and the multi-core processors to balance aging among the processor cores 320, 321, 322, 324, 326, and the multi-core processors. The scheduler 1700 may use current condition parameters and workloads in combination with the condition estimators to determine how to assign workloads to and configure the processor cores 320, 321, 322, 324, 326, and the multi-core processors to balance aging.

In various aspects, the scheduler 1700 may assign priorities to the processor cores 320, 321, 322, 324, 326 and the multi-core processors in relation to their estimated age. For example, the scheduler 1700 may assign higher priorities to the processor cores 320, 321, 322, 324, 326 and the multi-core processors that exhibit a lower estimated age, and assign lower priorities to the processor cores 320, 321, 322, 324, 326 and the multi-core processors that exhibit higher estimated age. The condition estimators may represent or be used to determine the estimated ages of the processor cores 320, 321, 322, 324, 326 and the multi-core processors. Workloads may be assigned to the available processor cores 320, 321, 322, 324, 326 and the multi-core processors with the highest priorities by the scheduler 1700.

In various aspects, the scheduler 1700 may assign workloads based on computational complexity. For example, the scheduler 1700 may assign workloads with higher computational complexity to the processor cores 320, 321, 322, 324, 326 and the multi-core processors that exhibit a lower estimated age and assign workloads with lower computational complexity to the processor cores 320, 321, 322, 324, 326 and the multi-core processors that exhibit higher estimated age. In various aspects, the scheduler 1700 may take into account condition estimators that indicate age based on prior execution of specific types of workloads and assign workloads to the processor cores 320, 321, 322, 324, 326 and the multi-core processors that are different from the types of workloads that are indicated to have aged the processor cores 320, 321, 322, 324, 326 and the multi-core processors.

In various aspects, the scheduler 1700 may assign workloads based on temperature, voltage, and/or frequency of the processor cores 320, 321, 322, 324, 326 and the multi-core processors. For example, the scheduler 1700 may assign workloads requiring high temperature, voltage, and/or frequency demands to the processor cores 320, 321, 322, 324, 326 and the multi-core processors exhibiting low current temperature, voltage, and/or frequency. The condition estimators may be used to indicate or determine the processor cores 320, 321, 322, 324, 326, and the multi-core processors that are showing signs of more advanced aging, and the scheduler 1700 may assign less resource hungry workloads to the processor cores 320, 321, 322, 324, 326, and the multi-core processors whose condition estimators indicate more advanced aging.

In various aspects, the scheduler 1700 may configure the processor cores 320, 321, 322, 324, 326 and the multi-core processors to operate within certain parameters. For example, processor cores 320, 321, 322, 324, 326 and/or the multi-core processors may be taken offline or operated with reduced temperature, voltage, and/or frequency based on the condition estimators. Such actions may be taken when condition estimators indicate or are used to determine that one or more of the processor cores 320, 321, 322, 324, 326 and/or the multi-core processors is more advanced aged or more likely to fail than other processor cores 320, 321, 322, 324, 326, and multi-core processors.

Such actions may be taken when indications of advanced age or likelihood of failure exceed threshold values. In some aspects, the scheduler 1700 may compare the condition estimators or data derived from the condition estimators to each other or to threshold values to determine when the processor cores 320, 321, 322, 324, 326 and the multi-core processors are sufficiently advanced aged or exhibiting a rate of aging that they should be reconfigured. The scheduler 1700 may also use the condition estimators or derive data from the condition estimators to indicate a likelihood of failure of the processor cores 320, 321, 322, 324, 326, and the multi-core processors.

In various aspects, the processor cores 320, 321, 322, 324, 326 and the multi-core processors may be brought back online or configured to operate with increased temperature, voltage, and/or frequency when the condition estimators for the processor cores 320, 321, 322, 324, 326 and the multi-core processors no longer exceed a threshold or have fallen back into an acceptable range. Thus, when the aging of a set of the processor cores 320, 321, 322, 324, 326, and the multi-core processors is acceptably balanced, processor cores 320, 321, 322, 324, 326 and the multi-core processors that were previously taken off-line or reconfigured may be restarted or reconfigured for more normal operations.

Operating the processor cores 320, 321, 322, 324, 326 and/or the multi-core processors at an advanced age or likelihood of failure or operating the processor cores 320, 321, 322, 324, 326 and the multi-core processors under increased operating parameters may extend their usefulness, but may also accelerate their deterioration. Thus, there may be a trade-off between operating life and overall usefulness of the processor cores 320, 321, 322, 324, 326 and the multi-core processors. The usefulness of the processor cores 320, 321, 322, 324, 326, and the multi-core processors may be increased by being used (vs. idled), or used for greater computation than when configured with reduced operating parameters. The effect of extending the usefulness of the processor cores 320, 321, 322, 324, 326, and the multi-core processors may be a reduction in lifespan or an increase in aging or likelihood of failure at a rate greater than during the offline state or use during configuration with reduced operating parameters. In situations of high likelihood of failure (including when failure of the processor cores or processors is certain), the scheduler 1700 may take the processor cores 320, 321, 322, 324, 326 and the multi-core processors offline and avoid bringing them back online.

The scheduler 1700 may be configured to assign use of and to configure the random access memory 1702 based on condition estimators or data derived from the condition estimators indicating retention time, errors, age, and/or likelihood of failure of the random access memory 1702. Such assignments and configuration may be performed for specific locations within the random access memory 1702. Like for the processor cores 320, 321, 322, 324, 326 and the multi-core processors, the scheduler 1700 may modify operating parameters or take offline certain random access memories 1702 or parts, such as banks or physical interfaces, of a random access memory 1702. In some aspects, the scheduler 1700 may modify the random access memory 1702 to shorten the intervals for refreshing the random access memories 1702 or parts of the random access memories 1702. In some aspects, the scheduler 1700 may increase voltage at low temperatures to drive the random access memories 1702 or parts of the random access memories 1702. In situations of high likelihood of failure (including when failure of the random access memories 1702 is certain), the scheduler 1700 may take the random access memories 1702 or parts of the random access memories 1702 offline and avoid bringing those memories back online.

In various aspects, the scheduler 1700 may be configurable, such as by a vendor or user, to select an aging management scheme from among a number of preprogrammed or programmable aging management schemes. For example, the scheduler 1700 may be configured with three alternative aging management schemes that: increase the lifespan of the computing device components by reducing wear on the computing device components at the expense of reducing performance of the computing device components; balance lifespan and performance of the computing device components; or increase performance of the computing device components at the expense of reducing the lifespan of the computing device components. Increasing the lifespan of the computing device components may be accomplished by reducing power, temperature, frequency, and/or demanding workloads for the computing device components. Increasing the performance of the computing device components may be accomplished by processing workloads by reducing processing time with less regard to the power, temperature, frequency, and/or wear from demanding workloads for the computing device components. Balancing lifespan and performance of the computing device components may be accomplished by constantly and/or periodically reevaluating the lifespan and performance of the computing device components and modifying the workloads and/or operating parameters of the computing device components to manage the aging and performance of the computing device components. In various aspects, the computing device 10 may provide information to a user indicating the condition of the computing device components, such as elapsed, relative, and/or remaining lifespan of the computing device components. The condition information may be provided by a display of the computing device and used by the user to decide how to configure the scheduler 1700.

In various aspects, configurations of the computing device components, the scheduler 1700, the sensors 1704, the counters and/or times 1706, and the reliability engine 302 may be implemented in a processor (e.g., the processor 14 in FIGS. 1 and 2), in general purpose hardware, in dedicated hardware, or in a combination of a software-configured processor (e.g., firmware or a kernel) and dedicated hardware that includes other individual components. These and the other components of the computing device 10 may be variably configured as number of independent and/or combined components located on or off the SoC 12.

Figure 18:
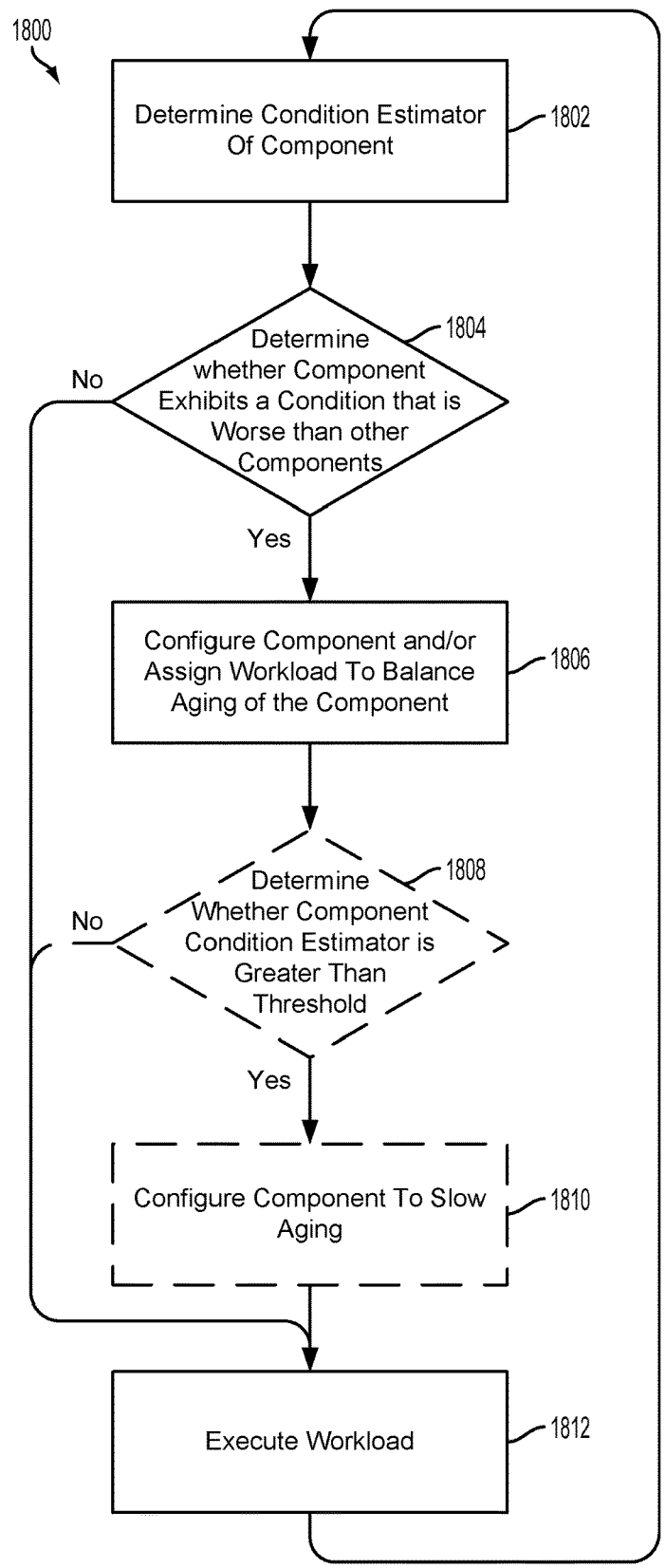
FIG. 18 is a process flow diagram illustrating an aspect method for managing components based on component condition estimators.

FIG. 18 is a process flow diagram illustrating an aspect method for managing components based on component condition estimators. The method 1800 may be implemented in a computing device in software executing in a processor (e.g., the processor 14 in FIGS. 1 and 2), in general purpose hardware, in dedicated hardware, or in a combination of a software-configured processor (e.g., firmware or a kernel) and dedicated hardware that includes other individual components. In order to encompass the alternative configurations enabled in the various aspects, the hardware implementing the method 1800 is referred to herein as a "processing device." In various aspects, the method 1800 may be executed repeatedly or in parallel with itself for multiple computing device components, and in parallel with the methods 1900, 2000, 2100 described with reference to FIGS. 19-21.

In block 1802, the processing device may determine a condition estimator of a computing device component. The condition estimator may be configured to estimate various conditions of a computing device component, such as age, rate of aging, stress, reliability, likelihood of failure, estimated interval to failure, failure, etc. Various formula, algorithms, and/or heuristics may be used to determine and interpret condition estimators, and use multiple condition estimators to determine how to manage a computing device component. An example process for determining a condition estimator of a computing device compounded that may be implemented in block 1802 is described with reference to the method 1900 and FIG. 19.

In determination block 1804, the processing device may determine whether the computing device component is exhibiting a condition that is worse than any number of other computing device components of the same or similar type. For example, the processing device may compare condition estimators or data derived from the condition estimators for various combinations of processor cores (e.g., processor cores 320, 321, 322, 324, 326 in FIGS. 3 and 17), multi-core processors (e.g., processor 14 in FIGS. 1 and 2), and/or random access memories (e.g., random access memory in FIG. 17). In some aspects, the operations in determination block 1804 may involve a comparison of condition estimators or data derived from the condition estimators in absolute terms. In some aspects, the operations in determination block 1804 may involve a comparison of condition estimators or data derived from the condition estimators to various criteria or thresholds defining a relationship between the compared condition estimators or data derived from the condition estimators. For example, such relationships may require or specify a minimum difference between the condition estimator or data derived from the condition estimator for a first computing device component and condition estimators or data derived from the condition estimators for any number of individual computing device components. As another example, such relationships may require or specify an average or mean of condition estimators or data derived from the condition estimators for any number of individual computing device components. As another example, such relationships may require or specify a measure of deviation from condition estimators or data derived from the condition estimators for any number of individual computing device components. As another example, such relationships may require or specify another numerical or symbolic relationship for comparing the condition estimator or data derived from the condition estimator for a first computing device component and condition estimators or data derived from the condition estimators for any number of individual or cumulative computing device components.

In response to determining that the computing device component is not exhibiting a condition that is worse than any number of other computing device components of the same or similar type (i.e., determination block 1804="No"), the processing device may execute a scheduled workload in block 1812. The workload may be scheduled by any known or proprietary means, including according to a prior configuration of the computing device component and/or workload assignment for the computing device component in block 1806. Thus, in various aspects the configuration of the computing device component and/or workload assignment for the computing device component in block 1806 may be persistent until changed.

In response to determining that the computing device component is exhibiting a condition that is worse than other computing device components of the same or similar type (i.e., determination block 1804="Yes"), the processing device may assign a workload to and/or configure operating parameters for the computing device component so as to balance aging of the component in block 1806. In other words, in block 1806 the processing device may assign a workload to and/or configure operating parameters for the computing device component balance deterioration of the measured condition of the computing device component with the condition of any number of other computing device components of the same or similar type. As discussed herein, the processing device may assign less demanding work to the computing device component exhibiting a worse condition, while assigning more demanding work to less aged computing device components. Assigning less demanding work to the computing device component may enable the component to execute the work load at a lower voltage and/or lower frequency, thereby enabling the component to operate at a lower temperature, than if the computing device component were assigned other workloads. For example, less demanding work may be threads or processes that involve relatively fewer operations per second by a processor or processing core compared to all threads and processes executing on the computing device. As another example, less demanding work may be threads or processes that will include more pause or wait states by a processor or processing core (e.g., waiting for memory fetches or other threads/processes to complete) compared to all threads and processes executing on the computing device. In block 1806 the type of assigned workload and/or the reconfiguration for the computing device component may be determined based on the condition estimators or data derived from the condition estimators for computing device component and the other computing device components.

In optional determination block 1808, the processing device may determine whether the condition estimator or data derived from the condition estimators for the computing device component is greater than a condition threshold. The condition threshold may indicate a level or value at which the condition estimators, or data derived from the condition estimators, for the computing device component indicate that the condition of the computing device component may be deteriorated or deteriorating at an unacceptable or undesirable rate.

In response to determining that the condition estimator or data derived from the condition estimators for the computing device component does not exceed the condition threshold (i.e., determination block 1808="No"), the processing device may execute the scheduled workload in block 1812.

In response to determining that the condition estimator or data derived from the condition estimators for the computing device component equals or exceeds the condition threshold (i.e., determination block 1808="Yes"), the processing device may configure the computing device component condition to slow or stop the deterioration. In various aspects, configuring the computing device component condition to slow or stop deterioration may be similar to configuring operating parameters for the computing device component to balance deterioration of the condition of the computing device component with other computing device components of the same or similar type in block 1806. However, rather than balancing deterioration of the condition of the computing device component with the condition of any number of other computing device components, the processor may configure the operating parameters to achieve a predetermined or calculated deterioration of the condition of the computing device component. In some aspects, to slow or stop deterioration of the condition of the computing device component, the processing device may take the computing device component offline so that it is not used and/or powered while it is offline.

Figure 19:
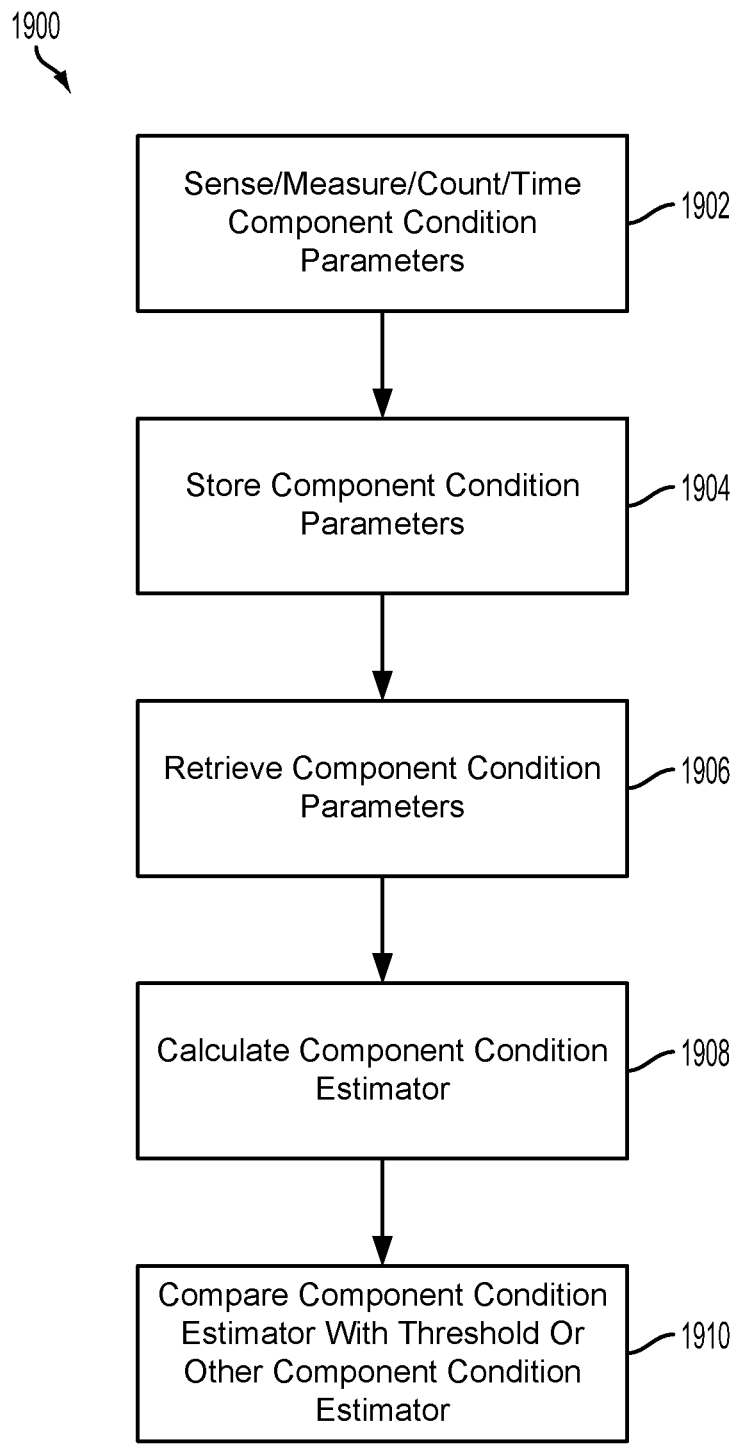
FIG. 19 is a process flow diagram illustrating an aspect method for determining component condition estimators.

FIG. 19 is a process flow diagram illustrating an aspect method for determining component condition estimators. The method 1900 may be implemented in a computing device in software executing in a processor (e.g., the processor 14 in FIGS. 1 and 2), in general purpose hardware, in dedicated hardware, or in a combination of a software-configured processor (e.g., firmware or a kernel) and dedicated hardware that includes other individual components. In order to encompass the alternative configurations enabled in the various aspects, the hardware implementing the method 1900 is referred to herein as a "processing device." In various aspects, the method 1900 may be executed repeatedly or in parallel with itself for multiple computing device components, and in parallel with the methods 1800, 2000, 2100 described with reference to FIGS. 18, 19, and 21. In various aspects, the method 1900 may describe further details of block 1802, determination block 1804, and optional determination block 1808 of the method 1800 described with reference to FIG. 18.

In block 1902, the processing device may sense, measure, count, and/or time condition parameters for a computing device component. As discussed herein, the processing device may sense, measure, count, and/or time a variety of condition parameters, including voltage level, operating frequency, aging, thermal output, use, performance, executed functions, workload types, faults or errors, and/or time during normal operation and/or execution of built in self tests of the computing device component. Whether the processing device senses, measures, counts, and/or times any combination of the condition parameters may be based on how the processing device is configured to manage the deterioration of the computing device components and the computing device components that are being managed. In various aspects, different criteria may be used to trigger sensing, measuring, counting, and/or timing condition parameters. Examples of criteria that may trigger sensing, measuring and/or timing of condition parameters may include thresholds, ranges, and/or types of sensed, measured, counted, and/or timed condition parameters.

In block 1904, the processing device may store the sensed, measured, counted, and/or timed condition parameters. As described herein, the processing device may store condition parameter data (e.g., the sensed, measured, counted, and/or timed condition parameters) in various formats, data structures, and/or databases in a memory (e.g., memory 16, 24, in FIG. 1). The condition parameter data may be stored in a manner that correlates various types of condition parameters with each other. For example, various temperatures, voltages, frequencies, aging indicators, operating times, executed functions, workload types, and/or errors for a computing device component may be stored in a correlated manner so that different combinations of correlated temperatures, voltages, frequencies, aging indicators, operating times, executed functions, workload types, and/or errors for the computing device component may be retrieved from memory. In various aspects, different criteria, such as thresholds, ranges, and/or types of sensed, measured, counted, and/or timed condition parameters may be used to correlate the condition parameter data. Stored condition parameter data may be updated based on later sensing, measuring, counting, and/or timing of the condition parameters satisfying the same criteria. In various aspects, the condition parameter data may be stored as discrete instances, cumulative instances, rates of instances of occurrence of the condition parameters, and/or changes in occurrence of the instances and/or rates of instance of occurrence of the condition parameters.

In various aspects, the condition parameter data may be encrypted and stored to the memory with a check-sum used to verify integrity of the condition parameter data when read at boot time. Encryption may be implemented for storage of the condition parameter data to a memory separate from a computing device component to which the condition parameter data pertains. In various aspects, security issues for which encryption may be used to safeguard against may be avoided by storing the condition parameter data on a memory integral to the computing device component to which the condition parameter data pertains. In various aspects, encryption and check-sum implementation for non-integral memory and security by storing to an integral memory may be implemented for any storage of data described herein, such as in blocks 507 and 517 in FIGS. 5, 14, and 15.

In some aspects, failure to verify the check-sum of the stored condition parameter data when reading the data from memory, such as at boot time, may cause the processing device to initiate a re-characterization of computing device components to assess the conditions of the computing device components. In some aspects, the processing device may read data from memory as described herein with reference to block 522 in FIGS. 5, 14, and 15, and block 1906 in FIG. 19. In some aspects, the processing device may run a built in self test to assess the condition of the computing device components, such as the built in self test described herein with reference to block 514 in FIGS. 5, 14, and 15, and block 2008 in FIG. 20. In some aspects, re-characterization of computing device components may be implemented for failure to verify the check-sum of the stored data read data from memory as described herein with reference to block 522 in FIGS. 5, 14, and 15, and block 1906 in FIG. 19.

In block 1906, the processing device may receive the condition parameter data from the memory in response to one or more triggers. In some aspects, the processing device may request the condition parameter data upon a trigger for evaluating the condition parameter data of the computing device components. In some aspects, the trigger may prompt the condition parameter data to be sent to the processing device without the processing device requesting the condition parameter data. Examples of such triggers may include: lapse of a period since last evaluating the condition parameters; a change in a state, including the condition parameter data, or availability of the computing device component; a change in a state, including the condition parameter data, or availability of any number of other computing device components; a request to use the computing device component; an available workload for the component device component; and/or a change in a setting for managing the computing device component.

In block 1908, the processing device may calculate a condition estimator for the computing device component using the condition parameter data. As described herein, different condition parameters may be used to calculate a condition estimator to indicate an estimated condition of a computing device component, such as age, rate of aging, stress, reliability, likelihood of failure, estimated interval to failure, failure, etc. Various formula, algorithms, and/or heuristics may be used to calculate condition estimators. Such formula, algorithms, and/or heuristics may use multiple condition parameters to calculate the condition estimators.

In block 1910, the processing device may compare condition estimators or data derived from the condition estimators for a computing device component to condition thresholds for the condition estimators and/or to condition estimators or data derived from the condition estimators for various combinations of other computing device components. In some aspects, the comparison of condition estimators or data derived from the condition estimators and/or condition thresholds may be made in absolute terms. In some aspects, the comparison of condition estimators or data derived from the condition estimators and/or condition thresholds may involve determining whether the condition estimators or data derived therefrom meet criteria defining a relationship between the compared condition estimators or derived data and condition thresholds. Such relationships may involve: a predetermined condition threshold; a minimum difference between the condition estimator or data derived from the condition estimator for a first computing device component and condition estimators or data derived from the condition estimators for any number of individual computing device components; average or mean of condition estimators or data derived from the condition estimators for any number of individual computing device components; a measure of deviation from condition estimators or data derived from the condition estimators for any number of individual computing device components; or any other numerical or symbolic relationship for comparing the condition estimator or data derived from the condition estimator for a first computing device component and condition estimators or data derived from the condition estimators for any number of individual or cumulative computing device components. This comparison of condition estimators or data derived therefrom may be used in determination block 1804 and optional determination block 1808 of the method 1800.

Figure 20:
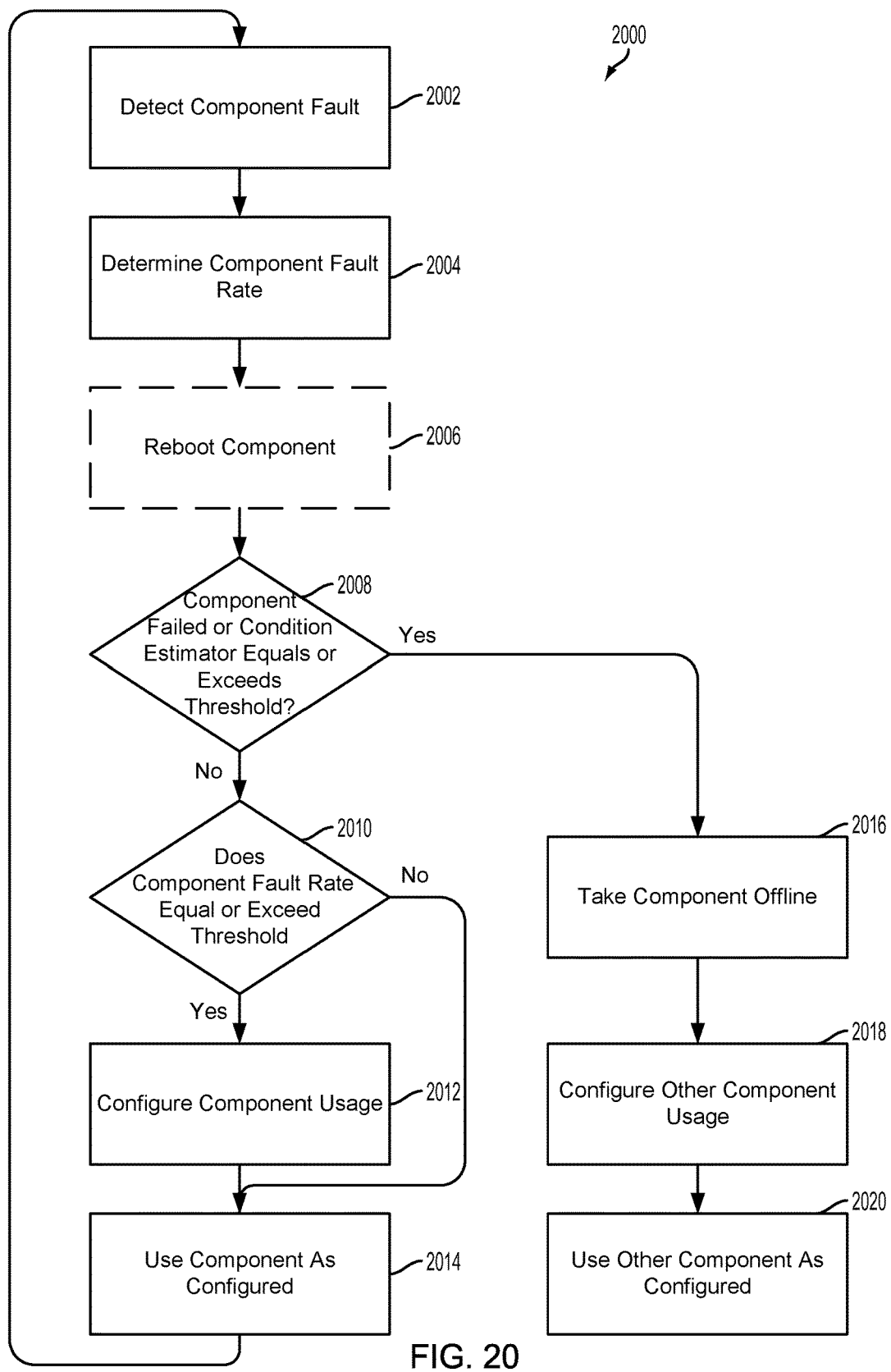
FIG. 20 is a process flow diagram illustrating an aspect method for managing components based on faults and/or failures.

FIG. 20 is a process flow diagram illustrating an aspect method for managing components based on faults and/or failures. The method 2000 may be implemented in a computing device in software executing in a processor (e.g., the processor 14 in FIGS. 1 and 2), in general purpose hardware, in dedicated hardware, or in a combination of a software-configured processor (e.g., firmware or a kernel) and dedicated hardware that includes other individual components. In order to encompass the alternative configurations enabled in the various aspects, the hardware implementing the method 2000 is referred to herein as a "processing device." In various aspects, the method 2000 may be executed repeatedly or in parallel with itself for multiple computing device components, and in parallel with the methods 1800, 1900, 2100 described with reference to FIGS. 18, 20, and 21.

In block 2002, the processing device may detect an error or fault in or by the computing device component. In various aspects, errors or faults may be condition parameters sensed, measured, counted, and/or timed by the processing device for the computing device component. For example, an error of fault may occur in a memory (such as random access memory 1702 in FIG. 17), a physical interface of a computing device component, by a processor core (e.g., processor cores 320, 321, 322, 324, 326 in FIGS. 3 and 17), or by a multi-core processor (e.g., processor 14 in FIGS. 1 and 2).

The error or fault may be detected when expected data is returned with errors in the data or when return of data fails.

In block 2004, the processing device may determine an error or fault rate for the computing device component. In some aspects, the error or fault rate may be determined based on detections of a condition parameter during a designated period. In some aspects, the error or fault rate may be determined using current condition parameters in combination with stored condition parameters to calculate the error or fault rate. In such aspects, the processing device may determine the error or fault rate based on the entire history of the stored condition parameters or a portion of the stored condition parameters.

In optional block 2006, the processing device may reboot the computing device component in or for which the error or fault is detected. In various aspects, a decision to implement rebooting the computing device component may depend on whether an error or fault rate or a cumulative number of error or faults equals or exceeds an error or fault threshold. A computing device exhibiting an undesirable error or fault rate or accumulation of errors or faults may be rebooted to see whether doing so clears or resolves the issue.

In determination block 2008, the processing device may determine whether the computing device component has failed or a condition estimator equals or exceeds a failure threshold. In various aspects, determining whether the computing device component has failed or exceeded a failure threshold may depend on whether an error or fault rate or a cumulative number of error or faults equals or exceeds the failure threshold. A computing device component exhibiting an undesirable error or fault rate or accumulation of errors or faults may be deemed to have failed or to be committing too many faults or errors to be satisfactory. In some aspects, a self test of the computing device component may be implemented to determine whether the computing device component has failed. The processing device may make any number of requests of or give any number of instructions to the computing device component and determine whether the computing device component has failed based on responses or lack of responses by the computing device component. Incorrect, incomplete, and/or no responses may indicate that the computing device has failed. In various aspects, the self test may be run for the computing device component during or following rebooting of the computing device component.

In response to determining that the computing device component has failed or a condition estimator equals or exceeds the failure threshold (i.e., determination block 2008="Yes"), the processing device may take the computing device component offline in block 2016. In various aspects, the processing device may remove the computing device component from a set or list of available computing device components, or indicate that the computing device component is offline and not to be used by assigning an indicator, such as a designated priority to the computing device component.

In block 2018, the processing device may assign workloads to and/or configure other computing device components that are still online to replace the offline computing device component. In various aspects, the other online computing device components may be configured such that performance is not affected or is proportionally affected by the loss of the offline computing device component. In other words, the processing device may configure online computing device components to replace the missing performance of the offline computing device component, or configure the online computing device components to operate with performance less than when the offline computing device component was online while still handling the duties of the offline computing device component. In block 2020, the processing device may use the online computing device components as configured while the offline computing device component remains offline.

In response to determining that the computing device component has not failed or a condition estimator does not equal or exceed the failure threshold (i.e., determination block 2008="No"), the processing device may determine whether the component fault rate or a cumulative number of faults for the computing device component equals or exceeds a fault threshold in determination block 2010. In various aspects, the fault threshold may be the same as or different from the fault threshold used to determine whether to reboot the computing device component in optional block 2006.

In response to determining that the component fault rate or cumulative number of faults for the computing device component does not equal or exceed the fault threshold (i.e., determination block 2010="No"), the processing device may use the computing device component as previously configured in block 2014.

In response to determining that the component fault rate or cumulative number of faults for the computing device component is greater than a fault threshold (i.e., determination block 2010="Yes"), the processing device may configure the computing device component for usage in block 2012. In various aspects, the processing device may configure the computing device component to reduce its amount of usage, or may configured the operating parameters of the computing device component to increase the operating parameters to improve the fault rate of the computing device component. For example, for errors or faults in the memory, the processing device may increase the refresh rate for the memory so that the memory better retains data. As another example, for errors or faults in physical interfaces of the computing device components, the processing device may increase the voltage to drive the physical interfaces so that the physical interfaces may successfully input and output data. In block 2014, the processing device may use the computing device component as configured.

Figure 21:
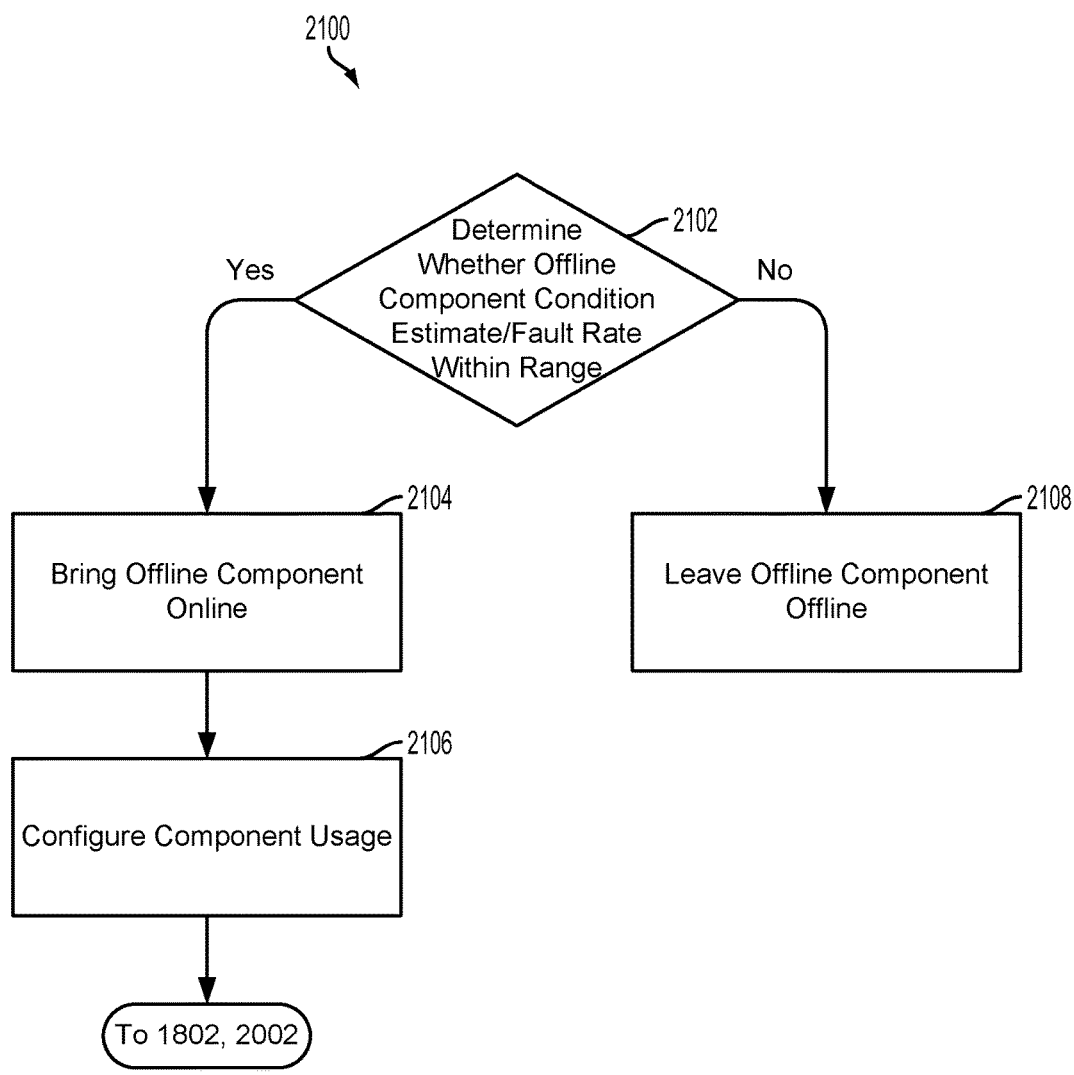
FIG. 21 is a process flow diagram illustrating an aspect method for managing components based on component condition estimators and/or faults.

FIG. 21 is a process flow diagram illustrating an aspect method for managing components based on component condition estimators and/or faults. The method 2100 may be implemented in a computing device in software executing in a processor (e.g., the processor 14 in FIGS. 1 and 2), in general purpose hardware, in dedicated hardware, or in a combination of a software-configured processor (e.g., firmware or a kernel) and dedicated hardware that includes other individual components. In order to encompass the alternative configurations enabled in the various aspects, the hardware implementing the method 2100 is referred to herein as a "processing device." In various aspects, the method 2100 may be executed repeatedly or in parallel with itself for multiple computing device components, and in parallel with the methods 1800, 1900, 2000 described with reference to FIGS. 18-20.

In determination block 2102, the processing device may determine whether an offline computing device component condition estimator (such as the error of fault rate or accumulated faults) is within a reactivation range. As computing device components deteriorate while the offline computing device component is not used, the failure threshold and fault threshold may change to accommodate keeping at least a minimum number of computing device components online. Thus, over time the condition estimator or data derived from the condition estimator indicative of the error or fault rate or accumulated errors or faults for the offline computing device component may no longer exceed the failure threshold. The processing device may determine that the operation of the offline processing device is no longer undesirable given the condition of the remaining online computing device components.

In response to determining that the offline computing device component condition estimator is within the reactivation range (i.e., determination block 2102="Yes"), the processing device may bring the offline computing device component back online in block 2104. In various aspects, the processing device may add the offline computing device component to a set or list of available computing device components. In various aspects, the processing device may mark the offline computing device component as available or online by assigning an indicator, such as a priority to the computing device component. In block 2106, the processing device may configure the computing device component for usage, such as configuring the component as described with reference to block 2012 of the method 2000 (FIG. 20) before determining a condition estimator of a computing device component in block 1802 of the method 1800 (FIG. 18), or detecting an error or fault by the computing device component in block 2002 of the method 2000 (FIG. 20).

In response to determining that the offline computing device component condition estimator is not within a reactivation range (i.e., determination block 2102="No"), the processing device may leave the offline computing device component offline in block 2108.

Figure 11:
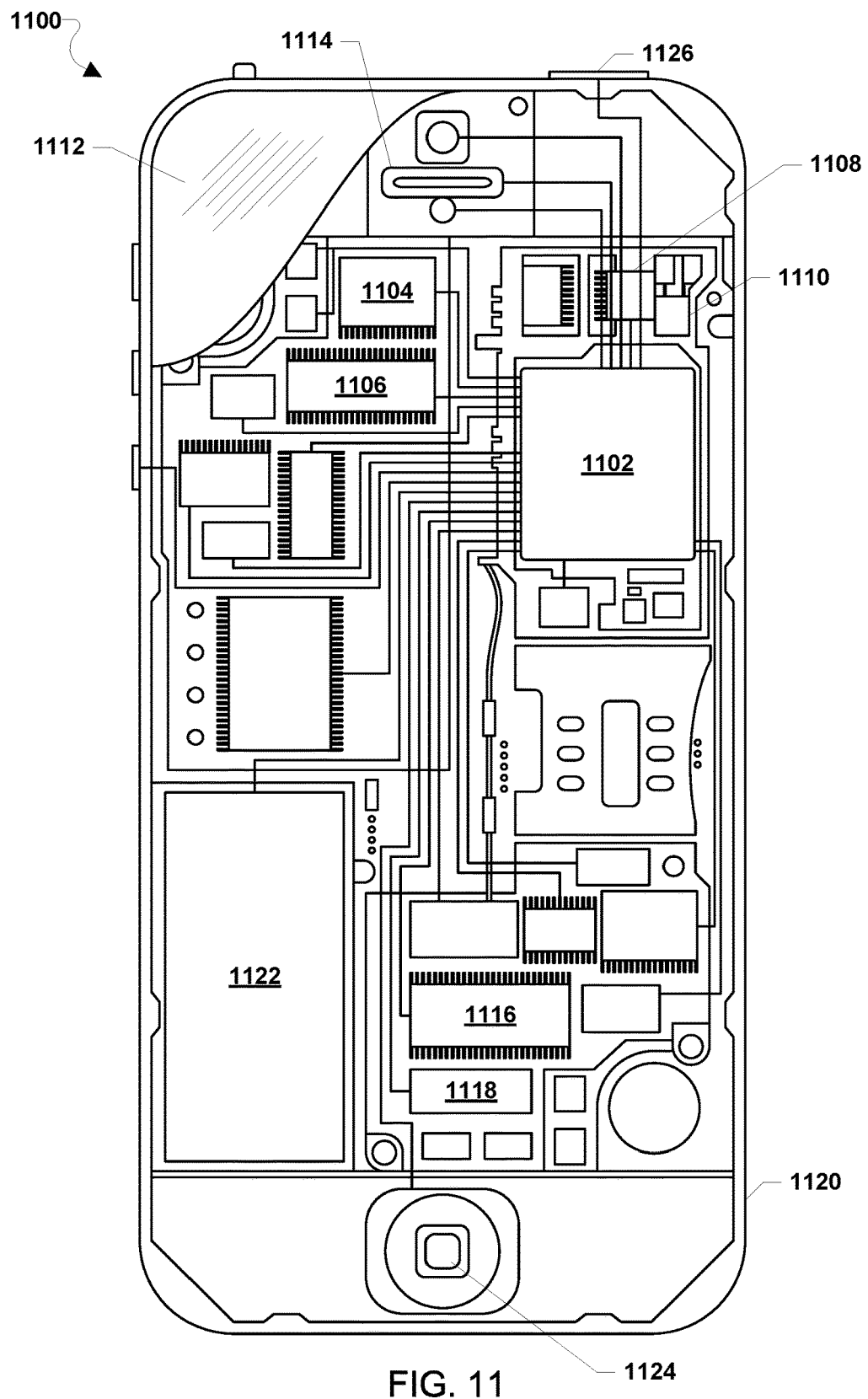
FIG. 11 is a component block diagram illustrating an example of a computing device suitable for use with the various aspects.
Figure 12:
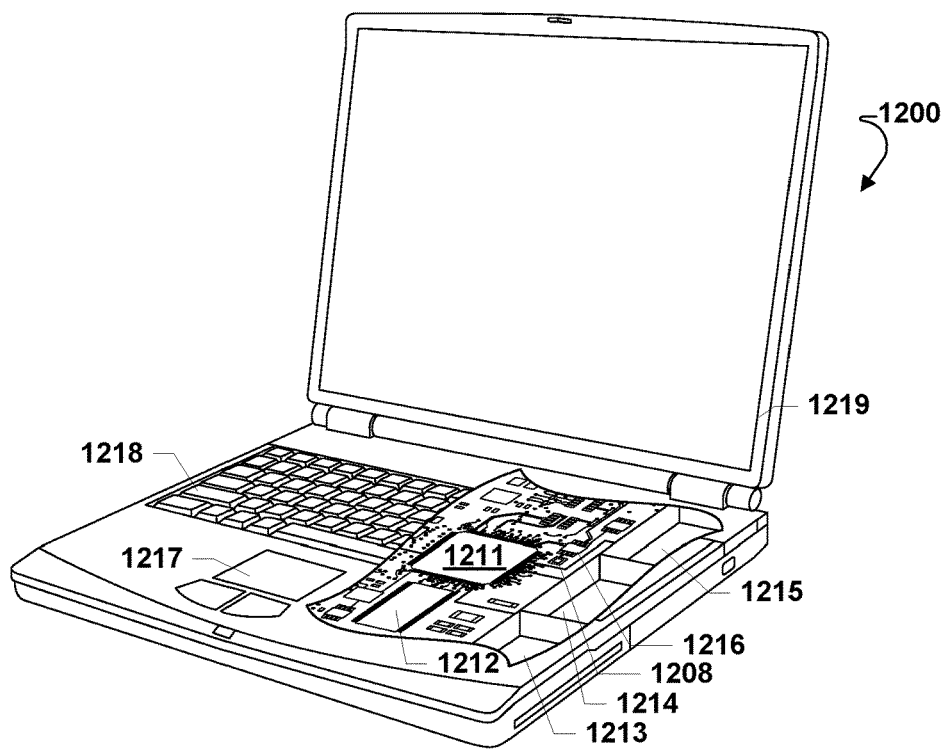
FIG. 12 is a component block diagram illustrating another example computing device suitable for use with the various aspects.

The various aspects (including, but not limited to, aspects discussed above with reference to FIGS. 1-21) may be implemented in a wide variety of computing systems, which may include the example mobile computing device suitable for use with the various aspects illustrated in FIG. 11. FIG. 11 illustrates an example of a computing device suitable for implementing the various aspects in the form of a smartphone. A smartphone computing device 1100 may include a multi-core processor 1102 coupled to a touchscreen controller 1104 and an internal memory 1106. The multi-core processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the multi-core processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The smartphone computing device 1100 may have one or more radio signal transceivers 1108 (e.g., Peanut, Bluetooth, Zigbee, Wi-Fi, RF radio) and antennae 1110, for sending and receiving communications, coupled to each other and/or to the multi-core processor 1102. The transceivers 1108 and antennae 1110 may be used with the above-mentioned circuitry to implement the various wireless transmission protocol stacks and interfaces. The smartphone computing device 1100 may include a cellular network wireless modem chip 1116 that enables communication via a cellular network and is coupled to the processor.

The smartphone computing device 1100 may include a peripheral device connection interface 1118 coupled to the multi-core processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The smartphone computing device 1100 may also include speakers 1114 for providing audio outputs. The smartphone computing device 1100 may also include a housing 1120, constructed of a plastic, metal, or a combination of materials, for containing all or some of the components discussed herein. The smartphone computing device 1100 may include a power source 1122 coupled to the multi-core processor 1102, such as a disposable or rechargeable battery. The rechargeable battery may also be coupled to the peripheral device connection port to receive a charging current from a source external to the smartphone computing device 1100. The smartphone computing device 1100 may also include a physical button 1124 for receiving user inputs. The smartphone computing device 1100 may also include a power button 1126 for turning the smartphone computing device 1100 on and off.

The various aspects (including, but not limited to, aspects discussed above with reference to FIGS. 1-21) may be implemented in a wide variety of computing systems, which may include the example mobile computing device suitable for use with the various aspects illustrated in FIG. 12. The various aspects described above may also be implemented within a variety of other computing devices, such as a laptop computer 1200 illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a multi-core processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the multi-core processor 1211. The computer 1200 may also include a floppy disc drive 1214 and a compact disc (CD) drive 1215 coupled to the multi-core processor 1211. In a notebook configuration, the computer housing includes the touchpad 1217, the keyboard 1218, and the display 1219 all coupled to the multi-core processor 1211. Other configurations of the computing device may include a computer mouse or trackball coupled to the processor (e.g., via a universal serial bus (USB) input) as are well known, which may also be used in conjunction with the various aspects. A desktop computer may similarly include these computing device components in various configurations, including separating and combining the components in one or more separate but connectable parts.

Figure 13:
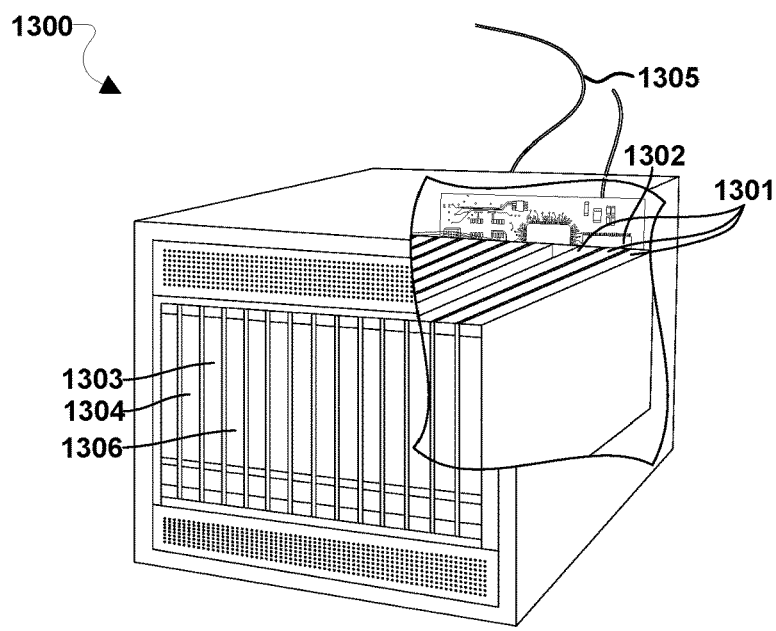
FIG. 13 is a component block diagram illustrating an example server device suitable for use with the various aspects.

The various aspects (including, but not limited to, aspects discussed above with reference to FIGS. 1-21) may be implemented in a wide variety of computing systems, which may include the example mobile computing device suitable for use with the various aspects illustrated in FIG. 13. The various aspects may also be implemented on any of a variety of commercially available server devices, such as the server 1300 illustrated in FIG. 13. Such a server 1300 typically includes one or more multi-core processor assemblies 1301 coupled to volatile memory 1302 and a large capacity nonvolatile memory, such as a disk drive 1304. As illustrated in FIG. 13, multi-core processor assemblies 1301 may be added to the server 1300 by inserting them into the racks of the assembly. The server 1300 may also include a floppy disc drive, compact disc (CD), or DVD disc drive 1306 coupled to the processor 1301. The server 1300 may also include network access ports 1303 coupled to the multi-core processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (in which non-privileged code runs) and a kernel space (in which privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc, wherein disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of managing a first computing device component of a computing device in order to extend an operating life of the first computing device component, comprising:
   determining a condition estimator of the first computing device component;
   determining whether the condition estimator of the first computing device component indicates that a condition of the first computing device component is worse than a condition of a second computing device component;
   assigning workloads to the first computing device component and the second computing device component to balance deterioration of the condition of the first computing device component with the deterioration of the condition of the second computing device component in response to determining that the condition estimator of the first computing device component indicates that the condition of the first computing device component is worse than the condition of the second computing device component;

determining a fault rate of the first computing device component using the condition estimator of the first computing device component;

determining whether the condition estimator of the first computing device component indicates that the first computing device component has failed;

determining whether the fault rate of the first computing device component equals or exceeds a fault threshold in response to determining that the condition estimator of the first computing device component indicates that the first computing device component has not failed; and configuring an operating parameter of the first computing device component to reduce the fault rate of the first computing device component during use of the first computing device component in response to determining that the fault rate of the first computing device component equals or exceeds the fault threshold.

2. The method of claim 1, further comprising:

determining whether the condition estimator of the first computing device component indicates that a rate of deterioration of the condition of the first computing device component exceeds a rate of deterioration of the condition of the second computing device component; and configuring an operating parameter of the first computing device component to slow the rate of deterioration of the condition of the first computing device component in response to determining that the rate of deterioration of the condition of the first computing device component exceeds the rate of deterioration of the condition of the second computing device component.

3. The method of claim 1, further comprising:

detecting a fault by the first computing device component using the condition estimator of the first computing device component;

and taking the first computing device component offline in response to determining that the condition estimator of the first computing device component indicates that the first computing device component has failed.

4. The method of claim 3, further comprising:

rebooting the first computing device component in response to detecting the fault by the first computing device component, wherein determining whether the condition estimator of the first computing device component indicates that the first computing device component has failed comprises:

running a self test for the first computing device component after rebooting the first computing device component; and determining the condition estimator of the first computing device component.

5. The method of claim 3, wherein determining whether the condition estimator of the first computing device component indicates that the first computing device component has failed comprises:

determining whether the fault rate of the first computing device component equals or exceeds a failure threshold, the method further comprising:

determining whether the condition estimator of the offline first computing device component indicates that the first computing device component is still failed; and bringing the first computing device component back online in response to determining that the condition estimator of the offline first computing device component indicates that the first computing device component is not still failed.

6. The method of claim 1, further comprising:

measuring a component condition parameter of a first type of the first computing device component;

storing the component condition parameter of the first computing device component in correlation with a component condition parameter of a second type of the first computing device component; and calculating the condition estimator using the component condition parameter of the first computing device component and the component condition parameter of the second type of the first computing device component.

7. The method of claim 6, further comprising updating the component condition parameter of the first type of the first computing device component with a later measurement of the component condition parameter of the first type of the first computing device component.

8. A computing device, comprising:

a first computing device component;

a second computing device component; and a processor electrically connected to the first computing device component and the second computing device component, wherein the processor is configured with processor-executable instructions to perform operations comprising:

determining a condition estimator of the first computing device component;

determining whether the condition estimator of the first computing device component indicates that a condition of the first computing device component is worse than a condition of the second computing device component;

assigning workloads to the first computing device component and the second computing device component to balance deterioration of the condition of the first computing device component with the deterioration of the condition of the second computing device component in response to determining that the condition estimator of the first computing device component indicates that the condition of the first computing device component is worse than the condition of the second computing device component;

determining a fault rate of the first computing device component using the condition estimator of the first computing device component;

determining whether the condition estimator of the first computing device component indicates that the first computing device component has failed;

determining whether the fault rate of the first computing device component equals or exceeds a fault threshold in response to determining that the condition estimator of the first computing device component indicates that the first computing device component has not failed; and configuring an operating parameter of the first computing device component to reduce the fault rate of the first computing device component during use of the first computing device component in response to determining that the fault rate of the first computing device component equals or exceeds the fault threshold.

9. The computing device of claim 8, wherein the processor is configured with processor-executable instructions to perform operations further comprising:
determining whether the condition estimator of the first computing device component indicates that a rate of deterioration of the condition of the first computing device component exceeds a rate of deterioration of the condition of the second computing device component; and
configuring an operating parameter of the first computing device component to slow the rate of deterioration of the condition of the first computing device component in response to determining that the rate of deterioration of the condition of the first computing device component exceeds the rate of deterioration of the condition of the second computing device component.

10. The computing device of claim 8, wherein the processor is configured with processor-executable instructions to perform operations further comprising:
detecting a fault by the first computing device component using the condition estimator of the first computing device component; and
taking the first computing device component offline in response to determining that the condition estimator of the first computing device component indicates that the first computing device component has failed.

11. The computing device of claim 10, wherein the processor is configured with processor-executable instructions to perform operations further comprising:
rebooting the first computing device component in response to detecting the fault by the first computing device component,
wherein determining whether the condition estimator of the first computing device component indicates that the first computing device component has failed comprises:
running a self test for the first computing device component after rebooting the first computing device component; and
determining the condition estimator of the first computing device component.

12. The computing device of claim 10, wherein:
the processor is configured with processor-executable instructions to perform operations such that determining whether the condition estimator of the first computing device component indicates that the first computing device component has failed comprises:
determining whether the fault rate of the first computing device component equals or exceeds a failure threshold; and
the processor is configured with processor-executable instructions to perform operations further comprising:
determining whether the condition estimator of the offline first computing device component indicates that the first computing device component is still failed; and
bringing the first computing device component back online in response to determining that the condition estimator of the offline first computing device component indicates that the first computing device component is not still failed.

13. The computing device of claim 8, wherein the processor is configured with processor-executable instructions to perform operations further comprising:
measuring a component condition parameter of a first type of the first computing device component;
storing the component condition parameter of the first computing device component in correlation with a component condition parameter of a second type of the first computing device component; and
calculating the condition estimator using the component condition parameter of the first computing device component and the component condition parameter of the second type of the first computing device component.

14. The computing device of claim 13, wherein the processor is configured with processor-executable instructions to perform operations further comprising updating the component condition parameter of the first type of the first computing device component with a later measurement of the component condition parameter of the first type of the first computing device component.

15. A computing device, comprising:
a first computing device component;
a second computing device component;
means for determining a condition estimator of the first computing device component;
means for determining whether the condition estimator of the first computing device component indicates that a condition of the first computing device component is worse than a condition of the second computing device component;
means for assigning workloads to the first computing device component and the second computing device component to balance deterioration of the condition of the first computing device component with the deterioration of the condition of the second computing device component in response to determining that the condition estimator of the first computing device component indicates that the condition of the first computing device component is worse than the condition of the second computing device component;
means for determining a fault rate of the first computing device component using the condition estimator of the first computing device component;
means for determining whether the condition estimator of the first computing device component indicates that the first computing device component has failed;
means for determining whether the fault rate of the first computing device component equals or exceeds a fault threshold in response to determining that the condition estimator of the first computing device component indicates that the first computing device component has not failed; and
means for configuring an operating parameter of the first computing device component to reduce the fault rate of the first computing device component during use of the first computing device component in response to determining that the fault rate of the first computing device component equals or exceeds the fault threshold.

16. The computing device of claim 15, further comprising:
means for determining whether the condition estimator of the first computing device component indicates that a rate of deterioration of the condition of the first computing device component exceeds a rate of deterioration of the condition of the second computing device component; and
means for configuring an operating parameter of the first computing device component to slow the rate of deterioration of the condition of the first computing device component in response to determining that the rate of deterioration of the condition of the first computing device component exceeds the rate of deterioration of the condition of the second computing device component.

17. The computing device of claim 15, further comprising:
means for detecting a fault by the first computing device component using the condition estimator of the first computing device component; and
means for taking the first computing device component offline in response to determining that the condition estimator of the first computing device component indicates that the first computing device component has failed.

18. The computing device of claim 17, further comprising:
means for rebooting the first computing device component in response to detecting the fault by the first computing device component,
wherein means for determining whether the condition estimator of the first computing device component indicates that the first computing device component has failed comprises:
means for running a self test for the first computing device component after rebooting the first computing device component; and
means for determining the condition estimator of the first computing device component.

19. The computing device of claim 17, wherein means for determining whether the condition estimator of the first computing device component indicates that the first computing device component has failed comprises:
means for determining whether the fault rate of the first computing device component equals or exceeds a failure threshold,
the computing device further comprising:
means for determining whether the condition estimator of the offline first computing device component indicates that the first computing device component is still failed; and
means for bringing the first computing device component back online in response to determining that the condition estimator of the offline first computing device component indicates that the first computing device component is not still failed.

20. The computing device of claim 15, further comprising:
means for measuring a component condition parameter of a first type of the first computing device component;
means for storing the component condition parameter of the first computing device component in correlation with a component condition parameter of a second type of the first computing device component;
means for calculating the condition estimator using the component condition parameter of the first computing device component and the component condition parameter of the second type of the first computing device component; and
means for updating the component condition parameter of the first type of the first computing device component with a later measurement of the component condition parameter of the first type of the first computing device component.

21. A non-transitory processor-readable medium having stored thereon processor-executable instructions configured to cause a processing device of a computing device to perform operations comprising:
determining a condition estimator of a first computing device component;
determining whether the condition estimator of the first computing device component indicates that a condition of the first computing device component is worse than a condition of a second computing device component;
assigning workloads to the first computing device component and the second computing device component to balance deterioration of the condition of the first computing device component with the deterioration of the condition of the second computing device component in response to determining that the condition estimator of the first computing device component indicates that the condition of the first computing device component is worse than the condition of the second computing device component;
determining a fault rate of the first computing device component using the condition estimator of the first computing device component;
determining whether the condition estimator of the first computing device component indicates that the first computing device component has failed;
determining whether the fault rate of the first computing device component equals or exceeds a fault threshold in response to determining that the condition estimator of the first computing device component indicates that the first computing device component has not failed; and
configuring an operating parameter of the first computing device component to reduce the fault rate of the first computing device component during use of the first computing device component in response to determining that the fault rate of the first computing device component equals or exceeds the fault threshold.

22. The non-transitory processor-readable medium of claim 21, wherein the stored processor-executable instructions are configured to cause the processing device of the computing device to perform operations further comprising:
determining whether the condition estimator of the first computing device component indicates that a rate of deterioration of the condition of the first computing device component exceeds a rate of deterioration of the condition of the second computing device component; and
configuring an operating parameter of the first computing device component to slow the rate of deterioration of the condition of the first computing device component in response to determining that the rate of deterioration of the condition of the first computing device component exceeds the rate of deterioration of the condition of the second computing device component.

23. The non-transitory processor-readable medium of claim 21, wherein the stored processor-executable instructions are configured to cause the processing device of the computing device to perform operations further comprising:
detecting a fault by the first computing device component using the condition estimator of the first computing device component; and
taking the first computing device component offline in response to determining that the condition estimator of the first computing device component indicates that the first computing device component has failed.

24. The non-transitory processor-readable medium of claim 23, wherein the stored processor-executable instructions are configured to cause the processing device of the computing device to perform operations further comprising:

rebooting the first computing device component in response to detecting the fault by the first computing device component, wherein determining whether the condition estimator of the first computing device component indicates that the first computing device component has failed comprises:

running a self test for the first computing device component after rebooting the first computing device component; and determining the condition estimator of the first computing device component.

25. The non-transitory processor-readable medium of claim 23, wherein:

the stored processor-executable instructions are configured to cause the processing device of the computing device to perform operations such that determining whether the condition estimator of the first computing device component indicates that the first computing device component has failed comprises:

determining whether the fault rate of the first computing device component equals or exceeds a failure threshold; and the stored processor-executable instructions are configured to cause the processing device of the computing device to perform operations further comprising:

determining whether the condition estimator of the offline first computing device component indicates that the first computing device component is still failed; and bringing the first computing device component back online in response to determining that the condition estimator of the offline first computing device component indicates that the first computing device component is not still failed.

26. The non-transitory processor-readable medium of claim 21, wherein the stored processor-executable instructions are configured to cause the processing device of the computing device to perform operations further comprising:

measuring a component condition parameter of a first type of the first computing device component;

storing the component condition parameter of the first computing device component in correlation with a component condition parameter of a second type of the first computing device component;

calculating the condition estimator using the component condition parameter of the first computing device component and the component condition parameter of the second type of the first computing device component; and updating the component condition parameter of the first type of the first computing device component with a later measurement of the component condition parameter of the first type of the first computing device component.

* * * * *